(12) United States Patent
Hays et al.

(10) Patent No.: US 11,794,070 B2
(45) Date of Patent: Oct. 24, 2023

(54) SYSTEMS AND METHODS FOR COOLING AN EXERCISE DEVICE

(71) Applicant: iFIT Inc., Logan, UT (US)

(72) Inventors: David Hays, Hyde Park, UT (US); Dale Alan Buchanan, Nibley, UT (US); Brian Kwant, Wellsville, UT (US)

(73) Assignee: iFIT Inc., Logan, UT (US)

( * ) Notice: Subject to any disclaimer, the term of this patent is extended or adjusted under 35 U.S.C. 154(b) by 446 days.

(21) Appl. No.: 16/879,376

(22) Filed: May 20, 2020

(65) Prior Publication Data

US 2020/0368575 A1 Nov. 26, 2020

Related U.S. Application Data

(60) Provisional application No. 62/852,118, filed on May 23, 2019.

(51) Int. Cl.
*A63B 22/02* (2006.01)
*F28F 19/01* (2006.01)
(Continued)

(52) U.S. Cl.
CPC ...... *A63B 22/0235* (2013.01); *A63B 22/0023* (2013.01); *F28F 19/01* (2013.01);
(Continued)

(58) Field of Classification Search
CPC . A63B 22/02; A63B 22/0207; A63B 22/0214; A63B 22/0221; A63B 22/0228;
(Continued)

(56) References Cited

U.S. PATENT DOCUMENTS

| 683,284 A | 9/1901 | Honey |
|---|---|---|
| 2,743,623 A | 5/1956 | Wells |

(Continued)

FOREIGN PATENT DOCUMENTS

| CN | 204972845 | 1/2016 |
|---|---|---|
| CN | 207024486 | 2/2018 |

(Continued)

OTHER PUBLICATIONS

U.S. Appl. No. 29/702,127, filed Sep. 16, 2019, Gordon Cutler.
(Continued)

*Primary Examiner* — Sundhara M Ganesan
*Assistant Examiner* — Zachary T Moore
(74) *Attorney, Agent, or Firm* — RAY QUINNEY & NEBEKER P.C.; Paul N. Taylor

(57) ABSTRACT

An exercise system includes a housing, a drive motor, a drive member, a filter, and a fan. The housing defines an interior volume and has an intake and an outlet. The drive motor is positioned in the housing and is connected to the drive member. At least part of the drive member is positioned inside the housing and part of the drive member is outside the housing. The drive member is positioned through the outlet in the housing. The filter is in fluid communication with the intake, and the fan is in fluid communication with the intake and the filter. The fan provides a positive pressure in the interior volume of the housing.

20 Claims, 8 Drawing Sheets

(51) Int. Cl.
*A63B 22/00* (2006.01)
*H02K 5/20* (2006.01)

(52) U.S. Cl.
CPC .......... *H02K 5/207* (2021.01); *A63B 2225/66* (2013.01); *F28F 2250/08* (2013.01)

(58) Field of Classification Search
CPC ............ A63B 22/0235; A63B 22/0242; A63B 22/025; A63B 22/0257; A63B 22/0264; A63B 22/0285; A63B 22/0292; A63B 2022/0271; A63B 2022/0278; F28F 19/01
See application file for complete search history.

(56) References Cited

U.S. PATENT DOCUMENTS

| | | |
|---|---|---|
| 3,123,646 A | 3/1964 | Easton |
| 3,368,746 A | 2/1968 | Zelinski |
| 3,579,339 A | 5/1971 | Chang |
| 4,023,795 A | 5/1977 | Pauls |
| 4,082,267 A | 4/1978 | Flavell |
| 4,300,760 A | 11/1981 | Bobroff |
| 4,334,695 A | 6/1982 | Ashby |
| D286,311 S | 10/1986 | Martinell |
| 4,681,318 A | 7/1987 | Lay |
| 4,684,126 A | 8/1987 | Dalebout |
| 4,728,102 A | 3/1988 | Pauls |
| 4,749,181 A | 6/1988 | Pittaway |
| 4,750,736 A | 6/1988 | Watterson |
| 4,788,493 A | 11/1988 | Liptak |
| 4,796,881 A | 1/1989 | Watterson |
| 4,813,667 A | 3/1989 | Watterson |
| 4,830,371 A | 5/1989 | Lay |
| 4,844,451 A | 7/1989 | Bersonnet |
| 4,850,585 A | 7/1989 | Dalebout |
| D304,849 S | 11/1989 | Watterson |
| 4,880,225 A | 11/1989 | Lucas |
| 4,883,272 A | 11/1989 | Lay |
| D306,468 S | 3/1990 | Watterson |
| D306,891 S | 3/1990 | Watterson |
| 4,913,396 A * | 4/1990 | Dalebout ............ A63B 22/0023 248/649 |
| D307,614 S | 5/1990 | Bingham |
| D307,615 S | 5/1990 | Bingham |
| 4,921,242 A | 5/1990 | Watterson |
| 4,932,650 A | 6/1990 | Bingham |
| D309,167 S | 7/1990 | Griffin |
| D309,485 S | 7/1990 | Bingham |
| 4,938,478 A | 7/1990 | Lay |
| D310,253 S | 8/1990 | Bersonnet |
| 4,955,599 A | 9/1990 | Bersonnet |
| 4,971,316 A | 11/1990 | Dalebout |
| D313,055 S | 12/1990 | Watterson |
| 4,974,832 A | 12/1990 | Dalebout |
| 4,979,737 A | 12/1990 | Kock |
| 4,981,294 A | 1/1991 | Dalebout |
| D315,765 S | 3/1991 | Measom |
| 4,998,725 A | 3/1991 | Watterson |
| 5,000,442 A | 3/1991 | Dalebout |
| 5,000,443 A | 3/1991 | Dalebout |
| 5,000,444 A | 3/1991 | Dalebout |
| D316,124 S | 4/1991 | Dalebout |
| 5,013,033 A | 5/1991 | Watterson |
| 5,014,980 A | 5/1991 | Bersonnet |
| 5,016,871 A | 5/1991 | Dalebout |
| D318,085 S | 7/1991 | Jacobson |
| D318,086 S | 7/1991 | Bingham |
| D318,699 S | 7/1991 | Jacobson |
| 5,029,801 A | 7/1991 | Dalebout |
| 5,034,576 A | 7/1991 | Dalebout |
| 5,058,881 A | 10/1991 | Measom |
| 5,058,882 A | 10/1991 | Dalebout |
| D321,388 S | 11/1991 | Dalebout |
| 5,062,626 A | 11/1991 | Dalebout |
| 5,062,627 A | 11/1991 | Bingham |
| 5,062,632 A | 11/1991 | Dalebout |
| 5,062,633 A | 11/1991 | Engel |
| 5,067,710 A | 11/1991 | Watterson |
| 5,072,929 A | 12/1991 | Peterson |
| D323,009 S | 1/1992 | Dalebout |
| D323,198 S | 1/1992 | Dalebout |
| D323,199 S | 1/1992 | Dalebout |
| D323,863 S | 2/1992 | Watterson |
| 5,088,729 A | 2/1992 | Dalebout |
| 5,090,694 A | 2/1992 | Pauls |
| 5,102,380 A * | 4/1992 | Jacobson ............... A63B 22/02 482/111 |
| 5,104,120 A | 4/1992 | Watterson |
| 5,108,093 A | 4/1992 | Watterson |
| D326,491 S | 5/1992 | Dalebout |
| 5,122,105 A | 6/1992 | Engel |
| 5,135,216 A | 8/1992 | Bingham |
| 5,147,265 A | 9/1992 | Pauls |
| 5,149,084 A | 9/1992 | Dalebout |
| 5,149,312 A | 9/1992 | Croft et al. |
| 5,171,196 A | 12/1992 | Lynch |
| D332,347 S | 1/1993 | Raadt |
| 5,190,505 A | 3/1993 | Dalebout |
| 5,192,255 A | 3/1993 | Dalebout |
| 5,195,937 A | 3/1993 | Engel |
| 5,203,826 A | 4/1993 | Dalebout |
| D335,511 S | 5/1993 | Engel |
| D335,905 S | 5/1993 | Cutter |
| D336,498 S | 6/1993 | Engel |
| 5,217,487 A | 6/1993 | Engel |
| D337,361 S | 7/1993 | Engel |
| D337,666 S | 7/1993 | Peterson |
| D337,799 S | 7/1993 | Cutter |
| 5,226,866 A | 7/1993 | Engel |
| 5,244,446 A | 9/1993 | Engel |
| 5,247,853 A | 9/1993 | Dalebout |
| 5,259,611 A | 11/1993 | Dalebout |
| D342,106 S | 12/1993 | Campbell |
| 5,279,528 A | 1/1994 | Dalebout |
| D344,112 S | 2/1994 | Smith |
| D344,557 S | 2/1994 | Ashby |
| 5,282,776 A | 2/1994 | Dalebout |
| 5,295,931 A | 3/1994 | Dreibelbis |
| 5,302,161 A | 4/1994 | Loubert |
| D347,251 S | 5/1994 | Dreibelbis |
| 5,316,534 A | 5/1994 | Dalebout |
| D348,493 S | 7/1994 | Ashby |
| D348,494 S | 7/1994 | Ashby |
| 5,328,164 A | 7/1994 | Soga |
| D349,931 S | 8/1994 | Bostic |
| 5,336,142 A | 8/1994 | Dalebout |
| 5,344,376 A | 9/1994 | Bostic |
| D351,202 S | 10/1994 | Bingham |
| D351,435 S | 10/1994 | Peterson |
| D351,633 S | 10/1994 | Bingham |
| D352,534 S | 11/1994 | Dreibelbis |
| D353,422 S | 12/1994 | Bostic |
| 5,372,559 A | 12/1994 | Dalebout |
| 5,374,228 A | 12/1994 | Buisman |
| 5,382,207 A | 1/1995 | Skowronski |
| 5,382,221 A | 1/1995 | Hsu |
| 5,387,168 A | 2/1995 | Bostic |
| 5,393,690 A | 2/1995 | Fu |
| D356,128 S | 3/1995 | Smith |
| 5,409,435 A | 4/1995 | Daniels |
| 5,429,563 A | 7/1995 | Engel |
| 5,431,612 A | 7/1995 | Holden |
| D360,915 S | 8/1995 | Bostic |
| 5,468,205 A | 11/1995 | McFall |
| 5,489,249 A | 2/1996 | Brewer |
| 5,492,517 A | 2/1996 | Bostic |
| D367,689 S | 3/1996 | Wilkinson |
| 5,511,740 A | 4/1996 | Loubert |
| 5,512,025 A | 4/1996 | Dalebout |
| D370,949 S | 6/1996 | Furner |
| D371,176 S | 6/1996 | Furner |
| 5,527,245 A | 6/1996 | Dalebout |
| 5,529,553 A | 6/1996 | Finlayson |
| 5,540,429 A | 7/1996 | Dalebout |

(56) References Cited

U.S. PATENT DOCUMENTS

| | | |
|---|---|---|
| 5,549,533 A | 8/1996 | Olson |
| 5,554,085 A | 9/1996 | Dalebout |
| 5,569,128 A | 10/1996 | Dalebout |
| 5,591,105 A | 1/1997 | Dalebout |
| 5,591,106 A | 1/1997 | Dalebout |
| 5,595,556 A | 1/1997 | Dalebout |
| 5,607,375 A | 3/1997 | Dalebout |
| 5,611,539 A | 3/1997 | Watterson |
| 5,622,527 A | 4/1997 | Watterson |
| 5,626,538 A | 5/1997 | Dalebout |
| 5,626,542 A | 5/1997 | Dalebout |
| D380,024 S | 6/1997 | Novak |
| 5,637,059 A | 6/1997 | Dalebout |
| D380,509 S | 7/1997 | Wilkinson |
| 5,643,153 A | 7/1997 | Nylen |
| 5,645,509 A | 7/1997 | Brewer |
| D384,118 S | 9/1997 | Deblauw |
| 5,662,557 A | 9/1997 | Watterson |
| 5,669,857 A | 9/1997 | Watterson |
| 5,672,140 A | 9/1997 | Watterson |
| 5,674,156 A | 10/1997 | Watterson |
| 5,674,453 A | 10/1997 | Watterson |
| 5,676,624 A | 10/1997 | Watterson |
| 5,683,331 A | 11/1997 | Dalebout |
| 5,683,332 A | 11/1997 | Watterson |
| D387,825 S | 12/1997 | Fleck |
| 5,695,433 A | 12/1997 | Buisman |
| 5,695,434 A | 12/1997 | Dalebout |
| 5,695,435 A | 12/1997 | Dalebout |
| 5,702,325 A | 12/1997 | Watterson |
| 5,704,879 A | 1/1998 | Watterson |
| 5,718,657 A | 2/1998 | Dalebout et al. |
| 5,720,200 A | 2/1998 | Anderson |
| 5,720,698 A | 2/1998 | Dalebout |
| D392,006 S | 3/1998 | Dalebout |
| 5,722,922 A | 3/1998 | Watterson |
| 5,733,229 A | 3/1998 | Dalebout |
| 5,743,833 A | 4/1998 | Watterson |
| 5,762,584 A | 6/1998 | Daniels |
| 5,762,587 A | 6/1998 | Dalebout |
| 5,772,560 A | 6/1998 | Watterson |
| 5,810,698 A | 9/1998 | Hullett |
| 5,827,155 A | 10/1998 | Jensen |
| 5,830,114 A | 11/1998 | Halfen |
| 5,860,893 A | 1/1999 | Watterson |
| 5,860,894 A | 1/1999 | Dalebout |
| 5,879,273 A | 3/1999 | Wei |
| 5,899,834 A | 5/1999 | Dalebout |
| D412,953 S | 8/1999 | Armstrong |
| D413,948 S | 9/1999 | Dalebout |
| 5,951,441 A | 9/1999 | Dalebout |
| 5,951,448 A | 9/1999 | Bolland |
| D416,596 S | 11/1999 | Armstrong |
| 6,003,166 A | 12/1999 | Hald |
| 6,019,710 A | 2/2000 | Dalebout |
| 6,027,429 A | 2/2000 | Daniels |
| 6,033,347 A | 3/2000 | Dalebout et al. |
| 6,042,513 A | 3/2000 | Koteles |
| 6,045,490 A | 4/2000 | Shafer |
| D425,940 S | 5/2000 | Halfen |
| 6,059,692 A | 5/2000 | Hickman |
| D428,949 S | 8/2000 | Simonson |
| 6,123,646 A | 9/2000 | Colassi |
| 6,171,217 B1 | 1/2001 | Cutler |
| 6,171,219 B1 | 1/2001 | Simonson |
| 6,174,267 B1 | 1/2001 | Dalebout |
| 6,193,631 B1 | 2/2001 | Hickman |
| 6,228,003 B1 | 5/2001 | Hald |
| 6,238,323 B1 | 5/2001 | Simonson |
| 6,251,052 B1 | 6/2001 | Simonson |
| 6,261,022 B1 | 7/2001 | Dalebout et al. |
| 6,280,362 B1 | 8/2001 | Dalebout et al. |
| 6,296,594 B1 | 10/2001 | Simonson |
| 6,300,694 B1 * | 10/2001 | Wang ............... F04D 25/082 310/63 |
| D450,872 S | 11/2001 | Dalebout |
| 6,312,363 B1 | 11/2001 | Watterson |
| D452,338 S | 12/2001 | Dalebout |
| D453,543 S | 2/2002 | Cutler |
| D453,948 S | 2/2002 | Cutler |
| 6,350,218 B1 | 2/2002 | Dalebout et al. |
| 6,387,020 B1 | 5/2002 | Simonson |
| 6,413,191 B1 | 7/2002 | Harris |
| 6,422,980 B1 | 7/2002 | Simonson |
| 6,447,424 B1 | 9/2002 | Ashby et al. |
| 6,458,060 B1 | 10/2002 | Watterson |
| 6,458,061 B2 | 10/2002 | Simonson |
| 6,471,622 B1 | 10/2002 | Hammer |
| 6,485,397 B1 | 11/2002 | Manderbacka |
| 6,563,225 B2 | 5/2003 | Soga |
| 6,601,016 B1 | 7/2003 | Brown |
| 6,623,140 B2 | 9/2003 | Watterson |
| 6,626,799 B2 | 9/2003 | Watterson |
| 6,652,424 B2 | 11/2003 | Dalebout |
| 6,676,569 B1 | 1/2004 | Radow |
| 6,685,607 B1 | 2/2004 | Olson |
| 6,695,581 B2 | 2/2004 | Wasson |
| 6,701,271 B2 | 3/2004 | Willner |
| 6,702,719 B1 | 3/2004 | Brown |
| 6,712,740 B2 | 3/2004 | Simonson |
| 6,730,002 B2 | 5/2004 | Hald |
| 6,743,153 B2 | 6/2004 | Watterson |
| 6,746,371 B1 | 6/2004 | Brown |
| 6,749,537 B1 | 6/2004 | Hickman |
| 6,761,667 B1 | 7/2004 | Cutler et al. |
| 6,770,015 B2 | 8/2004 | Simonson |
| 6,786,852 B2 | 9/2004 | Watterson |
| 6,808,472 B1 | 10/2004 | Hickman |
| 6,821,230 B2 | 11/2004 | Dalebout |
| 6,830,540 B2 | 12/2004 | Watterson |
| 6,863,641 B1 | 3/2005 | Brown |
| 6,866,613 B1 | 3/2005 | Brown |
| 6,875,160 B2 | 4/2005 | Watterson |
| D507,311 S | 7/2005 | Butler |
| 6,918,858 B2 | 7/2005 | Watterson |
| 6,921,351 B1 | 7/2005 | Hickman |
| 6,974,404 B1 | 12/2005 | Watterson |
| 6,997,852 B2 | 2/2006 | Watterson |
| 7,025,713 B2 | 4/2006 | Dalebout |
| D520,085 S | 5/2006 | Willardson |
| 7,044,897 B2 | 5/2006 | Myers |
| 7,052,442 B2 | 5/2006 | Watterson |
| 7,060,006 B1 | 6/2006 | Watterson |
| 7,060,008 B2 | 6/2006 | Watterson et al. |
| 7,070,539 B2 | 7/2006 | Brown |
| 7,097,588 B2 | 8/2006 | Watterson |
| D527,776 S | 9/2006 | Willardson |
| 7,112,168 B2 | 9/2006 | Dalebout et al. |
| 7,128,693 B2 | 10/2006 | Brown |
| 7,166,062 B1 | 1/2007 | Watterson |
| 7,166,064 B2 | 1/2007 | Watterson |
| 7,169,087 B2 | 1/2007 | Ercanbrack |
| 7,169,093 B2 | 1/2007 | Simonson |
| 7,192,388 B2 | 3/2007 | Dalebout |
| 7,250,022 B2 | 7/2007 | Dalebout |
| 7,282,016 B2 | 10/2007 | Simonson |
| 7,285,075 B2 | 10/2007 | Cutler |
| 7,344,481 B2 | 3/2008 | Watterson |
| 7,377,882 B2 | 5/2008 | Watterson |
| 7,425,188 B2 | 9/2008 | Ercanbrack |
| 7,429,236 B2 | 9/2008 | Dalebout |
| 7,455,622 B2 | 11/2008 | Watterson |
| 7,482,050 B2 | 1/2009 | Olson |
| D588,655 S | 3/2009 | Utykanski |
| 7,510,509 B2 | 3/2009 | Hickman |
| 7,537,546 B2 | 5/2009 | Watterson |
| 7,537,549 B2 | 5/2009 | Nelson |
| 7,537,552 B2 | 5/2009 | Dalebout |
| 7,540,828 B2 | 6/2009 | Watterson |
| 7,549,947 B2 | 6/2009 | Hickman |
| 7,556,590 B2 | 7/2009 | Watterson et al. |
| 7,563,203 B2 | 7/2009 | Dalebout |
| 7,575,536 B1 | 8/2009 | Hickman |
| 7,601,105 B1 | 10/2009 | Gipson, III |

(56) References Cited

U.S. PATENT DOCUMENTS

| | | | |
|---|---|---|---|
| 7,604,573 | B2 | 10/2009 | Dalebout |
| D604,373 | S | 11/2009 | Dalebout |
| 7,618,350 | B2 | 11/2009 | Dalebout |
| 7,618,357 | B2 | 11/2009 | Dalebout |
| 7,625,315 | B2 | 12/2009 | Hickman |
| 7,625,321 | B2 | 12/2009 | Simonson |
| 7,628,730 | B1 | 12/2009 | Watterson |
| 7,628,737 | B2 | 12/2009 | Kowallis |
| 7,637,847 | B1 | 12/2009 | Hickman |
| 7,645,212 | B2 | 1/2010 | Ashby et al. |
| 7,645,213 | B2 | 1/2010 | Watterson |
| 7,658,698 | B2 | 2/2010 | Pacheco |
| 7,674,205 | B2 | 3/2010 | Dalebout |
| 7,713,171 | B1 | 5/2010 | Hickman |
| 7,713,172 | B2 | 5/2010 | Watterson |
| 7,713,180 | B2 | 5/2010 | Wickens |
| 7,717,828 | B2 | 5/2010 | Simonson |
| 7,736,279 | B2 | 6/2010 | Dalebout |
| 7,740,563 | B2 | 6/2010 | Dalebout |
| 7,749,144 | B2 | 7/2010 | Hammer |
| 7,766,797 | B2 | 8/2010 | Dalebout |
| 7,771,329 | B2 | 8/2010 | Dalebout |
| 7,775,940 | B2 | 8/2010 | Dalebout |
| 7,789,800 | B1 | 9/2010 | Watterson |
| 7,798,946 | B2 | 9/2010 | Dalebout |
| 7,815,550 | B2 | 10/2010 | Watterson |
| 7,857,731 | B2 | 12/2010 | Hickman |
| 7,862,475 | B2 | 1/2011 | Watterson |
| 7,862,478 | B2 | 1/2011 | Watterson |
| 7,862,483 | B2 | 1/2011 | Hendrickson |
| D635,207 | S | 3/2011 | Dalebout |
| 7,901,330 | B2 | 3/2011 | Dalebout |
| 7,909,740 | B2 | 3/2011 | Dalebout |
| 7,980,996 | B2 | 7/2011 | Hickman |
| 7,981,000 | B2 | 7/2011 | Watterson |
| 7,985,164 | B2 | 7/2011 | Ashby |
| 8,011,242 | B2 | 9/2011 | O'neill |
| 8,029,415 | B2 | 10/2011 | Ashby et al. |
| 8,033,960 | B1 | 10/2011 | Dalebout |
| D650,451 | S | 12/2011 | Olson |
| D652,877 | S | 1/2012 | Dalebout |
| 8,152,702 | B2 | 4/2012 | Pacheco |
| D659,775 | S | 5/2012 | Olson |
| D659,777 | S | 5/2012 | Watterson |
| D660,383 | S | 5/2012 | Watterson |
| D664,613 | S | 7/2012 | Dalebout |
| 8,251,874 | B2 | 8/2012 | Ashby |
| 8,298,123 | B2 | 10/2012 | Hickman |
| 8,298,125 | B2 | 10/2012 | Colledge |
| D671,177 | S | 11/2012 | Sip |
| D671,178 | S | 11/2012 | Sip |
| D673,626 | S | 1/2013 | Olson |
| 8,690,735 | B2 | 4/2014 | Watterson |
| D707,763 | S | 6/2014 | Cutler |
| 8,740,753 | B2 | 6/2014 | Olson |
| 8,758,201 | B2 | 6/2014 | Ashby |
| 8,771,153 | B2 | 7/2014 | Dalebout |
| 8,784,270 | B2 | 7/2014 | Watterson |
| 8,808,148 | B2 | 8/2014 | Watterson |
| 8,814,762 | B2 | 8/2014 | Butler |
| D712,493 | S | 9/2014 | Ercanbrack |
| 8,840,075 | B2 | 9/2014 | Olson |
| 8,845,493 | B2 | 9/2014 | Watterson |
| 8,870,726 | B2 | 10/2014 | Watterson |
| 8,876,668 | B2 | 11/2014 | Hendrickson |
| 8,894,549 | B2 | 11/2014 | Colledge |
| 8,894,555 | B2 | 11/2014 | Olson |
| 8,911,330 | B2 | 12/2014 | Watterson |
| 8,920,288 | B2 | 12/2014 | Dalebout |
| 8,968,160 | B2 | 3/2015 | Cassano |
| 8,986,165 | B2 | 3/2015 | Ashby |
| 8,992,364 | B2 | 3/2015 | Law |
| 8,992,387 | B2 | 3/2015 | Watterson |
| D726,476 | S | 4/2015 | Ercanbrack |
| 9,028,368 | B2 | 5/2015 | Ashby |
| 9,028,370 | B2 | 5/2015 | Watterson |
| 9,039,578 | B2 | 5/2015 | Dalebout |
| D731,011 | S | 6/2015 | Buchanan |
| 9,072,930 | B2 | 7/2015 | Ashby |
| 9,119,983 | B2 | 9/2015 | Rhea |
| 9,123,317 | B2 | 9/2015 | Watterson |
| 9,126,071 | B2 | 9/2015 | Smith |
| 9,126,072 | B2 | 9/2015 | Watterson |
| 9,138,615 | B2 | 9/2015 | Olson |
| 9,142,139 | B2 | 9/2015 | Watterson |
| 9,144,703 | B2 | 9/2015 | Dalebout |
| 9,149,683 | B2 | 9/2015 | Smith |
| 9,186,535 | B2 | 11/2015 | Ercanbrack |
| 9,186,549 | B2 | 11/2015 | Watterson |
| 9,254,409 | B2 | 2/2016 | Dalebout |
| 9,254,416 | B2 | 2/2016 | Ashby |
| 9,278,248 | B2 | 3/2016 | Tyger |
| 9,278,249 | B2 | 3/2016 | Watterson |
| 9,278,250 | B2 | 3/2016 | Buchanan |
| 9,289,648 | B2 | 3/2016 | Watterson |
| 9,339,691 | B2 | 5/2016 | Brammer |
| 9,352,185 | B2 | 5/2016 | Hendrickson |
| 9,352,186 | B2 | 5/2016 | Watterson |
| 9,375,605 | B2 | 6/2016 | Tyger |
| 9,381,394 | B2 | 7/2016 | Mortensen |
| 9,387,387 | B2 | 7/2016 | Dalebout |
| 9,393,453 | B2 | 7/2016 | Watterson |
| 9,403,047 | B2 | 8/2016 | Olson |
| 9,403,051 | B2 | 8/2016 | Cutler |
| 9,421,416 | B2 | 8/2016 | Mortensen |
| 9,457,219 | B2 | 10/2016 | Smith |
| 9,457,220 | B2 | 10/2016 | Olson |
| 9,457,222 | B2 | 10/2016 | Dalebout |
| 9,460,632 | B2 | 10/2016 | Watterson |
| 9,463,356 | B2 | 10/2016 | Rhea |
| 9,468,794 | B2 | 10/2016 | Barton |
| 9,468,798 | B2 | 10/2016 | Dalebout |
| 9,480,874 | B2 | 11/2016 | Cutler |
| 9,492,704 | B2 | 11/2016 | Mortensen |
| 9,498,668 | B2 | 11/2016 | Smith |
| 9,517,378 | B2 | 12/2016 | Ashby |
| 9,521,901 | B2 | 12/2016 | Dalebout |
| 9,533,187 | B2 | 1/2017 | Dalebout |
| 9,539,461 | B2 | 1/2017 | Ercanbrack |
| 9,579,544 | B2 | 2/2017 | Watterson |
| 9,586,086 | B2 | 3/2017 | Dalebout |
| 9,586,090 | B2 | 3/2017 | Watterson |
| 9,604,099 | B2 | 3/2017 | Taylor |
| 9,616,276 | B2 | 4/2017 | Dalebout |
| 9,616,278 | B2 | 4/2017 | Olson |
| 9,623,281 | B2 | 4/2017 | Hendrickson |
| 9,636,567 | B2 | 5/2017 | Brammer |
| 9,671,316 | B2 | 6/2017 | Hsu |
| 9,675,839 | B2 | 6/2017 | Dalebout |
| 9,682,307 | B2 | 6/2017 | Dalebout |
| 9,694,234 | B2 | 7/2017 | Dalebout |
| 9,694,242 | B2 | 7/2017 | Ashby |
| 9,737,755 | B2 | 8/2017 | Dalebout |
| 9,757,605 | B2 | 9/2017 | Olson |
| 9,764,186 | B2 | 9/2017 | Dalebout |
| 9,767,785 | B2 | 9/2017 | Ashby |
| 9,776,039 | B1 | 10/2017 | Xu |
| 9,795,822 | B2 | 10/2017 | Smith |
| 9,808,672 | B2 | 11/2017 | Dalebout |
| 9,849,326 | B2 | 12/2017 | Smith |
| 9,878,210 | B2 | 1/2018 | Watterson |
| 9,889,334 | B2 | 2/2018 | Ashby |
| 9,889,339 | B2 | 2/2018 | Douglass |
| 9,937,376 | B2 | 4/2018 | McInelly |
| 9,937,377 | B2 | 4/2018 | McInelly |
| 9,937,378 | B2 | 4/2018 | Dalebout |
| 9,937,379 | B2 | 4/2018 | Mortensen |
| 9,943,719 | B2 | 4/2018 | Smith |
| 9,943,722 | B2 | 4/2018 | Dalebout |
| 9,948,037 | B2 | 4/2018 | Ashby |
| 9,968,816 | B2 | 5/2018 | Olson |
| 9,968,821 | B2 | 5/2018 | Finlayson |
| 9,968,823 | B2 | 5/2018 | Cutler |
| 10,010,755 | B2 | 7/2018 | Watterson |

(56) References Cited

U.S. PATENT DOCUMENTS

| | | | |
|---|---|---|---|
| 10,010,756 B2 | 7/2018 | Watterson |
| 10,029,145 B2 | 7/2018 | Douglass |
| D826,350 S | 8/2018 | Hochstrasser |
| 10,046,196 B2 | 8/2018 | Ercanbrack |
| D827,733 S | 9/2018 | Hochstrasser |
| 10,065,064 B2 | 9/2018 | Smith |
| 10,071,285 B2 | 9/2018 | Smith |
| 10,085,586 B2 | 10/2018 | Smith |
| 10,086,254 B2 | 10/2018 | Watterson |
| 10,136,842 B2 | 11/2018 | Ashby |
| 10,186,161 B2 | 1/2019 | Watterson |
| 10,188,890 B2 | 1/2019 | Olson |
| 10,207,143 B2 | 2/2019 | Dalebout |
| 10,207,145 B2 | 2/2019 | Tyger |
| 10,207,147 B2 | 2/2019 | Ercanbrack |
| 10,207,148 B2 | 2/2019 | Powell |
| 10,212,994 B2 | 2/2019 | Watterson |
| 10,220,259 B2 | 3/2019 | Brammer |
| 10,226,396 B2 | 3/2019 | Ashby |
| 10,226,664 B2 | 3/2019 | Dalebout |
| 10,252,109 B2 | 4/2019 | Watterson |
| 10,258,828 B2 | 4/2019 | Dalebout |
| 10,272,317 B2 | 4/2019 | Watterson |
| 10,279,212 B2 | 5/2019 | Dalebout |
| 10,293,211 B2 | 5/2019 | Watterson |
| D852,292 S | 6/2019 | Cutler |
| 10,343,017 B2 | 7/2019 | Jackson |
| 10,376,736 B2 | 8/2019 | Powell |
| 10,388,183 B2 | 8/2019 | Watterson |
| 10,391,361 B2 | 8/2019 | Watterson |
| D864,320 S | 10/2019 | Weston |
| D864,321 S | 10/2019 | Weston |
| 10,426,989 B2 | 10/2019 | Dalebout |
| 10,433,612 B2 | 10/2019 | Ashby |
| 10,441,840 B2 | 10/2019 | Dalebout |
| 10,449,416 B2 | 10/2019 | Dalebout |
| D868,909 S | 12/2019 | Cutler |
| 10,492,519 B2 | 12/2019 | Capell |
| 10,493,349 B2 | 12/2019 | Watterson |
| 10,500,473 B2 | 12/2019 | Watterson |
| 10,543,395 B2 | 1/2020 | Powell et al. |
| 10,561,877 B2 | 2/2020 | Workman |
| 10,561,893 B2 | 2/2020 | Chatterton |
| 10,561,894 B2 | 2/2020 | Dalebout |
| 10,569,121 B2 | 2/2020 | Watterson |
| 10,569,123 B2 | 2/2020 | Hochstrasser |
| 2002/0016235 A1 | 2/2002 | Ashby |
| 2002/0077221 A1 | 6/2002 | Dalebout |
| 2002/0159253 A1 | 10/2002 | Dalebout |
| 2003/0045406 A1 | 3/2003 | Stone |
| 2003/0139259 A1 | 7/2003 | Kuo |
| 2004/0002406 A1* | 1/2004 | Lopez-Santillana ............ A63B 22/0235 482/54 |
| 2004/0005961 A1 | 1/2004 | Lund |
| 2004/0091307 A1 | 5/2004 | James |
| 2004/0171464 A1 | 9/2004 | Ashby |
| 2004/0171465 A1 | 9/2004 | Hald |
| 2005/0049123 A1 | 3/2005 | Dalebout |
| 2005/0077805 A1 | 4/2005 | Dalebout |
| 2005/0107229 A1 | 5/2005 | Wickens |
| 2005/0164839 A1 | 7/2005 | Watterson |
| 2005/0272577 A1 | 12/2005 | Olson |
| 2007/0117683 A1 | 5/2007 | Ercanbrack |
| 2007/0254778 A1 | 11/2007 | Ashby |
| 2008/0020907 A1 | 1/2008 | Lin |
| 2008/0051256 A1 | 2/2008 | Ashby |
| 2008/0242520 A1 | 10/2008 | Hubbard |
| 2008/0300110 A1 | 12/2008 | Smith |
| 2009/0105052 A1 | 4/2009 | Dalebout |
| 2010/0242246 A1 | 9/2010 | Dalebout |
| 2012/0237911 A1 | 9/2012 | Watterson |
| 2012/0295774 A1 | 11/2012 | Dalebout |
| 2013/0123083 A1 | 5/2013 | Sip |
| 2013/0165195 A1 | 6/2013 | Watterson |
| 2013/0172152 A1 | 7/2013 | Watterson |
| 2013/0172153 A1 | 7/2013 | Watterson |
| 2013/0178334 A1 | 7/2013 | Brammer |
| 2013/0178768 A1 | 7/2013 | Dalebout |
| 2013/0190136 A1 | 7/2013 | Watterson |
| 2013/0196298 A1 | 8/2013 | Watterson |
| 2013/0196821 A1 | 8/2013 | Watterson |
| 2013/0196822 A1 | 8/2013 | Watterson |
| 2013/0218585 A1 | 8/2013 | Watterson |
| 2013/0244836 A1 | 9/2013 | Maughan |
| 2013/0267383 A1 | 10/2013 | Watterson |
| 2013/0268101 A1 | 10/2013 | Brammer |
| 2013/0274067 A1 | 10/2013 | Watterson |
| 2013/0281241 A1 | 10/2013 | Watterson |
| 2014/0024499 A1 | 1/2014 | Watterson |
| 2014/0073970 A1 | 3/2014 | Ashby |
| 2014/0121071 A1 | 5/2014 | Strom |
| 2014/0135173 A1 | 5/2014 | Watterson |
| 2014/0274574 A1 | 9/2014 | Shorten |
| 2014/0274579 A1 | 9/2014 | Olson |
| 2014/0287884 A1 | 9/2014 | Buchanan |
| 2014/0309085 A1 | 10/2014 | Watterson |
| 2015/0182779 A1 | 7/2015 | Dalebout |
| 2015/0182781 A1 | 7/2015 | Watterson |
| 2015/0238817 A1 | 8/2015 | Watterson |
| 2015/0250418 A1 | 9/2015 | Ashby |
| 2015/0251055 A1 | 9/2015 | Ashby |
| 2015/0253735 A1 | 9/2015 | Watterson |
| 2015/0253736 A1 | 9/2015 | Watterson |
| 2015/0258560 A1 | 9/2015 | Ashby |
| 2016/0058335 A1 | 3/2016 | Ashby |
| 2016/0063615 A1 | 3/2016 | Watterson |
| 2016/0092909 A1 | 3/2016 | Watterson |
| 2016/0101311 A1 | 4/2016 | Workman |
| 2016/0107065 A1 | 4/2016 | Brammer |
| 2016/0121074 A1 | 5/2016 | Ashby |
| 2016/0148535 A1 | 5/2016 | Ashby |
| 2016/0148536 A1 | 5/2016 | Ashby |
| 2016/0158595 A1 | 6/2016 | Dalebout |
| 2016/0346595 A1 | 12/2016 | Dalebout |
| 2017/0036053 A1 | 2/2017 | Smith |
| 2017/0043288 A1* | 2/2017 | Reitz ................... F24F 8/80 |
| 2017/0056711 A1 | 3/2017 | Dalebout |
| 2017/0056715 A1 | 3/2017 | Dalebout |
| 2017/0124912 A1 | 5/2017 | Ashby |
| 2017/0193578 A1 | 7/2017 | Watterson |
| 2017/0266489 A1 | 9/2017 | Douglass |
| 2017/0266533 A1 | 9/2017 | Dalebout |
| 2017/0270820 A1 | 9/2017 | Ashby |
| 2017/0326410 A1* | 11/2017 | Lin ................... A63B 22/0076 |
| 2018/0001135 A1* | 1/2018 | Powell ................... H02K 9/06 |
| 2018/0036585 A1 | 2/2018 | Powell |
| 2018/0085630 A1 | 3/2018 | Capell |
| 2018/0089396 A1 | 3/2018 | Capell |
| 2018/0099116 A1 | 4/2018 | Ashby |
| 2018/0099180 A1 | 4/2018 | Wilkinson |
| 2018/0111034 A1 | 4/2018 | Watterson |
| 2018/0117385 A1 | 5/2018 | Watterson |
| 2018/0117393 A1 | 5/2018 | Ercanbrack |
| 2018/0154209 A1 | 6/2018 | Watterson |
| 2018/0200566 A1 | 7/2018 | Weston |
| 2019/0058370 A1 | 2/2019 | Tinney |
| 2019/0080624 A1 | 3/2019 | Watterson |
| 2019/0151698 A1 | 5/2019 | Olson |
| 2019/0168072 A1 | 6/2019 | Brammer |
| 2019/0178313 A1 | 6/2019 | Wrobel |
| 2019/0192898 A1 | 6/2019 | Dalebout |
| 2019/0192952 A1 | 6/2019 | Powell |
| 2019/0209893 A1 | 7/2019 | Watterson |
| 2019/0223612 A1 | 7/2019 | Watterson |
| 2019/0232112 A1 | 8/2019 | Dalebout |
| 2019/0269958 A1 | 9/2019 | Dalebout |
| 2019/0269971 A1 | 9/2019 | Capell |
| 2019/0275366 A1 | 9/2019 | Powell |
| 2019/0282852 A1 | 9/2019 | Dalebout |
| 2019/0328079 A1 | 10/2019 | Ashby |
| 2019/0329091 A1 | 10/2019 | Powell |
| 2019/0376585 A1 | 12/2019 | Buchanan |
| 2020/0009417 A1 | 1/2020 | Dalebout |

(56) References Cited

U.S. PATENT DOCUMENTS

| | | |
|---|---|---|
| 2020/0016459 A1 | 1/2020 | Smith |
| 2020/0238130 A1 | 7/2020 | Silcock |
| 2020/0254295 A1 | 8/2020 | Watterson |
| 2020/0254309 A1 | 8/2020 | Watterson |
| 2020/0254311 A1 | 8/2020 | Watterson |

FOREIGN PATENT DOCUMENTS

| | | |
|---|---|---|
| CN | 208158340 | 11/2018 |
| KR | 200282784 | 7/2002 |
| TW | 177052 | 1/1992 |
| TW | M253381 | 12/2004 |
| TW | M333198 | 6/2008 |
| TW | M517957 | 2/2016 |
| TW | 201808393 | 3/2018 |
| WO | 198907473 | 8/1989 |
| WO | 2003084614 | 10/2003 |

OTHER PUBLICATIONS

U.S. Appl. No. 13/088,007, filed Apr. 15, 2011, Scott R. Watterson.
U.S. Appl. No. 15/973,176, filed May 7, 2018, Melanie Douglass.
U.S. Appl. No. 16/879,376, filed May 20, 2020, David Hays.
U.S. Appl. No. 16/992,870, filed Aug. 13, 2020, Gaylen Ercanbrack.
U.S. Appl. No. 16/992,886, filed Aug. 13, 2020, William T. Dalebout.
U.S. Appl. No. 17/067,310, filed Oct. 9, 2020, Jared Willardson.
U.S. Appl. No. 62/897,113, filed Sep. 9, 2019, Megan Jane Ostler.
U.S. Appl. No. 62/934,291, filed Nov. 12, 2019, William T. Dalebout.
U.S. Appl. No. 62/934,297, filed Nov. 12, 2019, William T. Dalebout.
Taiwan Search Report and Office Action issued in application No. 106122194 dated Jan. 19, 2018 with English translation.
International Search Report and Written Opinion issued in PCT/US2020/033851 dated Sep. 11, 2020.
Darken et al., The Omni-Directional Treadmill: A Locomotion Device for Virtual Worlds, Calhoun: The NPS Institutional Archive Dspace Repository, 1997.
Office Action received in Taiwanese Application No. 109116885, dated Nov. 27, 2020, 11 pages.

\* cited by examiner

SYSTEMS AND METHODS FOR COOLING AN EXERCISE DEVICE

CROSS-REFERENCE TO RELATED APPLICATIONS

This application claims priority to provisional patent application No. 62/852,118 entitled "SYSTEMS AND METHODS FOR COOLING AN EXERCISE DEVICE" filed May 23, 2019, which application is herein incorporated by reference for all that it discloses.

BACKGROUND

Technical Field

This disclosure generally relates to exercise devices. More particularly, this disclosure generally relates to providing cool and clean air or other cooling fluid to one or more electronic components of an exercise device.

Background and Relevant Art

Various exercise devices utilize motors to move or adjust components of the exercise device. A treadmill uses a drive motor to turn a tread belt that is supported by rollers. The tread belt moves underneath the user to provide a moving surface on which the user walks or runs to exercise. The drive motor and control electronics generate heat during operation.

SUMMARY

In some embodiments, an exercise system includes a housing, a drive motor, a drive member, a filter, and a fan. The housing defines an interior volume and has an intake and an outlet. The drive motor is positioned in the housing and is connected to the drive member. At least part of the drive member is positioned inside the housing and part of the drive member is outside the housing. The drive member is positioned through the outlet in the housing. The filter is in fluid communication with the intake, and the fan is in fluid communication with the intake and the filter. The fan provides a positive pressure in the interior volume of the housing.

In some embodiments, an exercise system includes a base, a housing supported by the base, a drive motor, a drive belt, a roller, a filter, and a fan. The housing defines an interior volume and has an intake and an outlet. The drive motor is positioned in the housing and is connected to the drive belt. At least part of the drive belt is movable from outside the housing to inside the housing through the outlet. The roller is connected to the drive belt and driven by the drive belt. The filter is in fluid communication with the intake, and the fan is in fluid communication with the intake and the filter. The fan provides a positive pressure in the interior volume of the housing.

In some embodiments, an exercise system includes a base, a housing supported by the base, a drive motor, a belt, a filter, and a fan. The housing defines an interior volume and has an intake and an outlet. The drive motor is positioned in the housing and is connected to the drive belt. At least part of the drive belt is movable from outside the housing to inside the housing through the outlet. The roller is connected to the drive belt and driven by the drive belt. The filter is in fluid communication with the intake, and the fan is in fluid communication with the intake and the filter. The fan provides a positive pressure in the interior volume of the housing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a top view of the exercise device of FIG. 1-1, according to at least one embodiment of the present disclosure;

FIG. 2 is a perspective view of an exercise device with a clean air intake, according to at least one embodiment of the present disclosure;

FIG. 17-1 is a schematic representation of a housing connected to an external conduit, according to at least one embodiment of the present disclosure; and FIG. 17-2 is a schematic representation of the housing of FIG. 17-1 with an external conduit coupled to a cleaning port, according to at least one embodiment of the present disclosure.

DETAILED DESCRIPTION

In some embodiments of an exercise device according to the present disclosure, an exercise device may include a cooling system that provides clean, cool air to a housing of the exercise device that contains electronic components and prevents dirt and debris from entering the housing. The electronic components generate heat during use. For example, a drive motor, a tilt motor, control electronics, a bleed resistor, and other components such as shock absorbers or brakes all generate heat during use that can adversely affect the performance and/or reliability of the exercise device during use or over long-term usage. In some examples, heat can damage solder or other electrical connections and cause one or more parts of the exercise device to fail.

Even with airflow through the housing containing the heat generating components, extracting the heat and keeping the components cool can be challenging. Environmental dirt and debris can exacerbate the problems with the heat generation by accumulating in or on the components of the exercise device. Fluid droplet and particulates, such as dust and dirt, can stick to heat generating components and create an insulating layer on the components. The insulating layer of debris can limit the dissipation of heat and prevent cool air from extracting and carrying away heat from the components.

In some embodiments of the present disclosure, an exercise system includes a sealed housing with a filtered intake to prevent the introduction of dust and debris from the system through the intake. In at least one embodiment, a fan draws air in through the intake into an interior volume of the housing to create a positive pressure in the interior volume and at an outlet of the housing. The positive pressure can limit and/or prevent the entrance of debris through the outlet.

Figure 1:
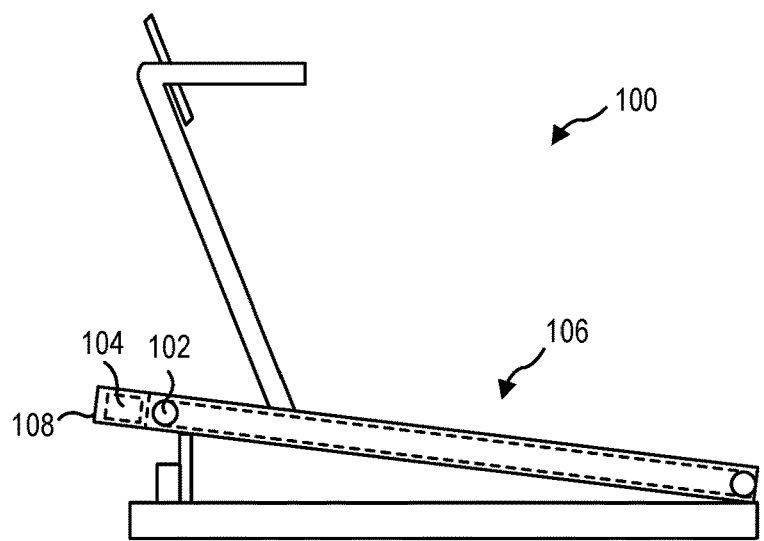
FIG. 1-1 is a side view of an exercise device, according to at least one embodiment of the present disclosure.

FIG. 1 is a side view of an embodiment of an exercise device 100 according to the present disclosure. The exercise device 100 includes a roller 102 that is driven by a drive motor 104. The roller 102, in turn, supports and drives a tread belt 106. While embodiments of the present disclosure will be described in relation to a treadmill, it should be understood that the sealed housing, filtered intake, positive pressure outlet, and other features described herein may be applicable to other types of exercise devices, such as elliptical machines, stationary bicycles, handcycles, step machines, rowing machines, etc.

The drive motor 104 and other components are contained within a housing 108. The drive motor 104 can generate heat that becomes trapped in the housing 108. The temperature inside the housing 108 can increase and potentially damage components in the housing during use. For example, in a commercial gym setting, a treadmill drive motor 104 may be in operation for many hours per day. In some commercial gyms open 24 hours each day, a drive motor 104 could potentially be in operation nearly continuously. Thermal management can increase the operational lifetime and reliability of such exercise devices.

Figures 1, 2:
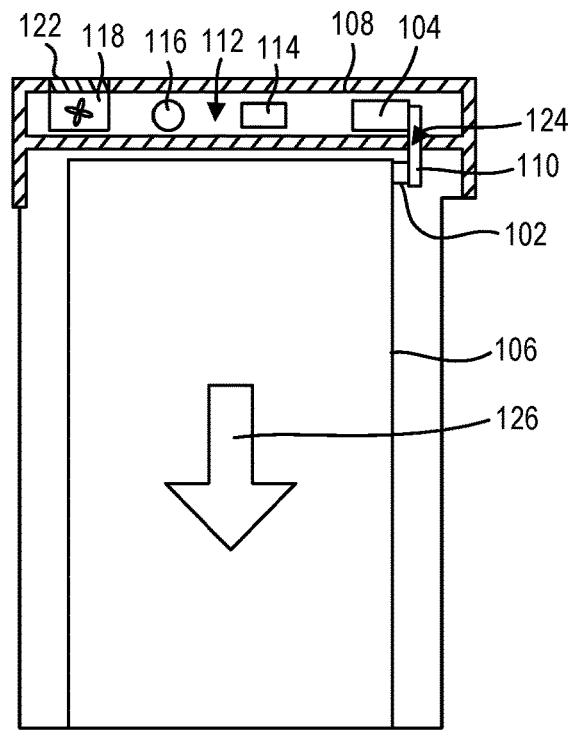
Figure 2:
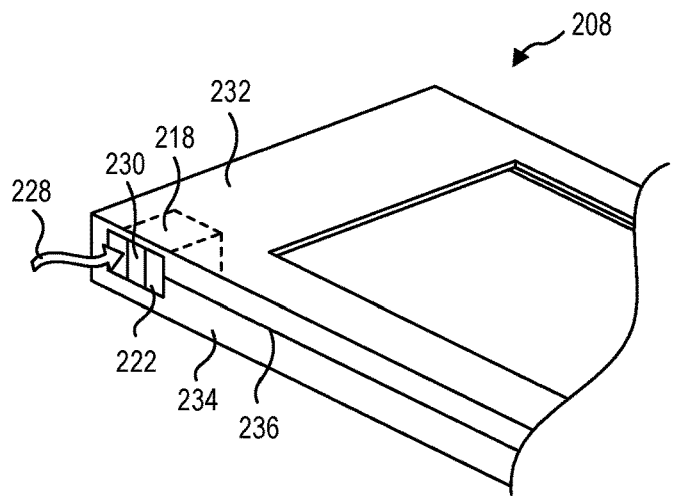

FIG. 1-2 is a top cross-sectional view of the housing 108 and tread belt 106 of FIG. 1-1. The tread belt 106 is driven by the drive motor 104 through a driven member 110 connecting the drive motor 104 to the roller 102. In some embodiments, the driven member 110 is a drive belt. In other embodiments, the driven member 110 is another rotational element, such as a drive chain. In yet other embodiments, the driven member 110 is a reciprocal or oscillating element, such as a piston or piston rod. In further embodiments, the driven member 110 is a rotating rod or similar element to deliver torque from the drive motor 104 to the roller 102.

The housing 108 defines an interior volume 112 in which the drive motor 104 and other heat generating components are positioned. For example, the housing 108 may contain control electronics 114, a tilt motor 116, a fan 118, or other components. In some embodiments, the housing 108 may be sealed to limit the movement of debris into the interior volume 112. For example, the housing 108 can be sealed such that the only openings in the housing 108 to the interior volume 112 are a filtered intake 122 and an outlet 124 through which the driven member 110 is positioned.

The tread belt 106 moves with a rotational direction 126 to provide the moving surface on which a user walks or runs. In order to provide that movement, the driven member 110 moves relative to the housing 108. For example, a drive belt, such as illustrated in FIG. 1-2, rotates as the drive motor 104 rotor rotates, and the drive belt transmits the rotation to the roller 102 to move the tread belt 106. As the drive belt (or other driven member 110) moves relative to the housing 108, the drive belt can potentially draw debris into the interior volume 112 of the housing 108. For example, debris may be affixed to the drive belt and carried into the interior volume 112 through the outlet 124. In other examples, drag on the air surrounding the drive belt may cause air to flow into the outlet 124 and draw debris into the interior volume 112.

In some embodiments, the fan 118 draws air in through the filtered intake 122 and creates a positive pressure in the interior volume 112 to overcome the drag created by the movement of the driven member 110. The positive pressure in the interior volume 112 and through the outlet(s) 124 may, therefore, limit and/or prevent the introduction of debris into the interior volume 112 through the outlet 124. In some embodiments, the positive pressure in the interior volume 112 and/or at the outlet(s) 124 is greater than the surrounding atmospheric air pressure (i.e., greater than 1.0 atm). In other embodiments, the positive pressure in the interior volume 112 and/or at the outlet(s) 124 is at least 5% greater than the surrounding atmospheric air pressure (i.e., greater than 1.05 atm). In yet other embodiments, the positive pressure in the interior volume 112 and/or at the outlet(s) 124 is at least 10% greater than the surrounding atmospheric air pressure (i.e., greater than 1.1 atm).

FIG. 2 is a perspective view of an embodiment of a housing 208 of an exercise system, according to the present disclosure. The housing 208 includes a fan 218 that draws in intake air 228 through an intake 222. The intake 222 allows the intake air 228 to enter a filter 230 positioned in the air flow path of the intake 222 and the fan 218. The order and/or relative positioning of the filter 230 and the fan 218 in the air flow path may vary, as will be described herein. The filter 230 is positioned in the air flow path to filter the intake air 228 before exposure to any of the components housed in the housing 208, thereby ensuring only filtered air comes in contact with the electronic components.

To further limit and/or prevent the exposure of electronic components to unfiltered air, the housing 208 may be sealed along any joints, with the exception of the intake 222 and any outlets. For example, a housing 208 may be formed through a clamshell configuration or other mating of a first portion 232 and a second portion 234. The first portion 232 and second portion 234 may have a joint therebetween. The housing 208 can include a sealing member 236, such as a gasket, a cover, an adhesive, a tape, or other material or structure that is applied to and/or positioned in the joint to limit and/or prevent air flow through the joint between the first portion 232 and second portion 234. With air flow only available through the intake 222, the air in the housing 208 can be limited to only the intake air 228 that passed through the filter 230.

In some embodiments, the filter 230 is a particulate filter. For example, the filter 230 may have a particle rating (e.g., the larger particle that can pass through the filter 230) of less than 1 micrometer (µm). In other examples, the filter 230 can have a particle rating of less than 0.5 µm. In yet other examples, the filter 230 can have a particle rating of less than 0.3 µm. In at least one example, the filter 230 has a particle rating of less than 0.25 µm. In other embodiments, the filter 230 is a reactive filter, such as an activate carbon filter. In yet other embodiments, the filter 230 is a high efficiency particulate air (HEPA) filter. In further embodiments, the filter 230 includes an electrostatic filter to remove charged or ionized particles. In yet further embodiments, the filter 230 includes an ultraviolet light to irradiate the intake air 228 and/or filtered air after intake air 228 passes through a portion of the filter 230.

Figure 3:
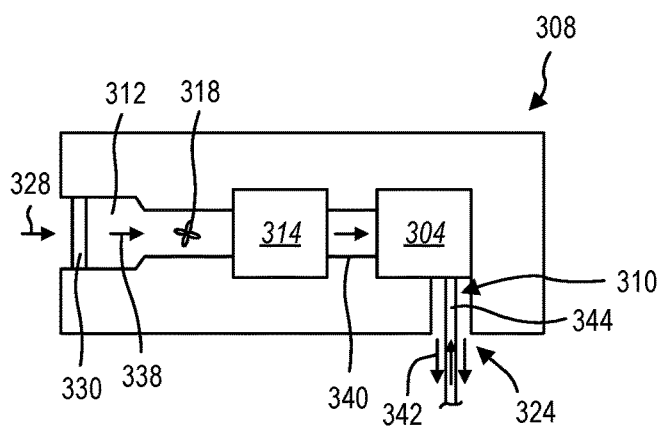
FIG. 3 is a schematic representation of an air flow path through a housing, according to at least one embodiment of the present disclosure.

FIG. 3 through FIG. 9 schematically illustrate various configurations of the air flow and components in a housing, according to the present disclosure. FIG. 3 is a schematic representation of a housing 308. The housing 308 may contain a fan 318, a filter 330, control electronics 314, and a drive motor 304. The intake air 328 is drawn into an interior volume 312 of the housing 308 defined by a series of boxes or covers around the components with conduits 340 therebetween. The filter 330 is positioned in the path of the air flow before the fan 318 to filter intake air 328 before the filtered air 338 contacts the fan 318. The fan 318 can then direct the filtered air 338 at the control electronics 314. The control electronics 314 are positioned directly adjacent the fan 318 in the air flow path of the filtered air 338 such that the control electronics 314 receive the filtered air 338 at the lowest temperature in the housing 308 for the efficient cooling of the control electronics 314.

The filtered air 338 can pass from the control electronics 314 through a conduit 340 to the drive motor 304 to cool the drive motor 304. The warm filtered air 342 can subsequently pass from in and/or around the drive motor 304 through the outlet 324 and out of the housing 308. The outlet 324 may be shared with the driven member 310, as described in relation to FIG. 1-2. In some embodiments, the driven member 310 may have an inbound portion 344 that moves into the housing 308 toward the drive motor 304 from outside the housing 308. The inbound portion 344 of the driven member 310 can carry or drag debris into the housing 308 through the outlet 324. The flow of intake air 328 into and the filtered air 338 through the housing creates a positive pressure in the housing 308 that blows the warm filtered air 342 out the outlet 324. The exhaust of the warm filtered air 342 limits and/or prevents the introduction of debris through the outlet 324 even when the inbound portion 344 of the driven member 310 is moving into the housing 308.

Figure 4:
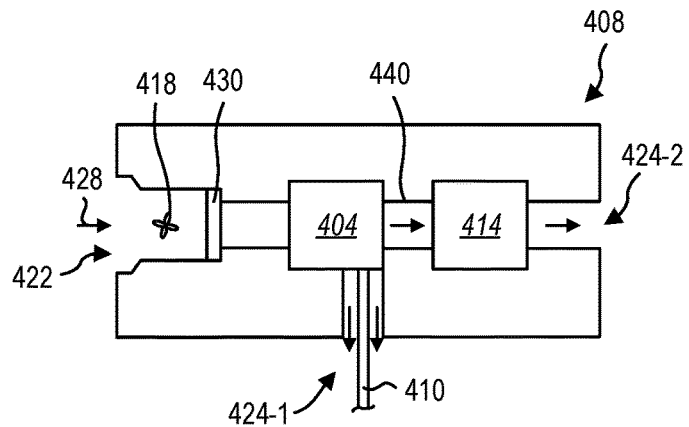
FIG. 4 is a schematic representation of another air flow path through a housing, according to at least one embodiment of the present disclosure.

As will be described herein, the position of components in the air flow path can change to accommodate different cooling and thermal management needs depending on the components and the relative heat generation of the components. For example, the control electronics 314 may be more sensitive to damage from heat than the drive motor 304. FIG. 4 schematically illustrates another example of an exercise device housing 408 with cooling for electronic components. The fan 418 is positioned in the intake 422 to draw intake air 428 in and toward the filter 430. In some instances, the fan 418 may include an oil or other lubricant on an axle of the fan 418. Positioning a filter 430 after the fan 418 in the air flow path can filter any lubricant particles from the intake air 428.

In some embodiments, the drive motor 404 is placed closer to the fan 418 than the control electronics 414. For example, the drive motor 404 may be more susceptible to heat damage than the control electronics 414. In other examples, the drive motor 404 may operate at a lower temperature than the control electronics 414. In such examples, the air may be too warm after passing the control electronics 414 to sufficiently cool the drive motor 404. Positioning the drive motor 404 before the control electronics 414 allows the drive motor 404 to be cooled before the air continues through the conduit 440 to the control electronics 414, which heat the air more.

Some embodiments of housings 408 may have a plurality of outlets 424-1, 424-2. For example, the first outlet 424-1 may be shared with the driven member 410, such as described in relation to FIG. 3. When the drive motor 404 is positioned in the air flow path before the control electronics or other components to be cooled, the first outlet 424-1 exhausts filtered air before all components are cooled by the air. As shown in FIG. 4, a second outlet 424-2 can exhaust filtered air that has passed around or through the control electronics 414 or other components. The fan 418 can maintain a positive pressure at both the first outlet 424-1 and the second outlet 424-2.

In some embodiments, the housing 408 can have a plurality of intakes 422 to allow a sufficient volume of cool air to be introduced to the housing 408 for cooling. In some examples, the intake 422 (or plurality of intakes) can have a total intake area that is equal to or greater than a total outlet area of the outlet or plurality of outlets 424-1, 424-2. A larger intake area than outlet area causes the air drawn in by the fan 418 to accelerate through the interior volume and/or conduits 440 of the housing 408. The increased speed at the outlets may aid in limiting and/or preventing debris from flowing back in through the outlets. In some embodiments, an I/O ratio (intake area to outlet area) may be in a range having an upper value, a lower value, or upper and lower values including any of 1:1, 3:2, 2:1, 3:1, 4:1, 5:1, 7:1, 10:1, or any values therebetween. For example, the I/O ratio of the housing 408 may be greater than 1:1. In other examples, the I/O ratio of the housing 408 may be less than 10:1. In yet other examples, the I/O ratio may be between 1:1 and 10:1. In yet other examples, the I/O ratio may be between 3:2 and 4:1. In at least one example, the I/O ratio is about 2:1.

Figure 5:
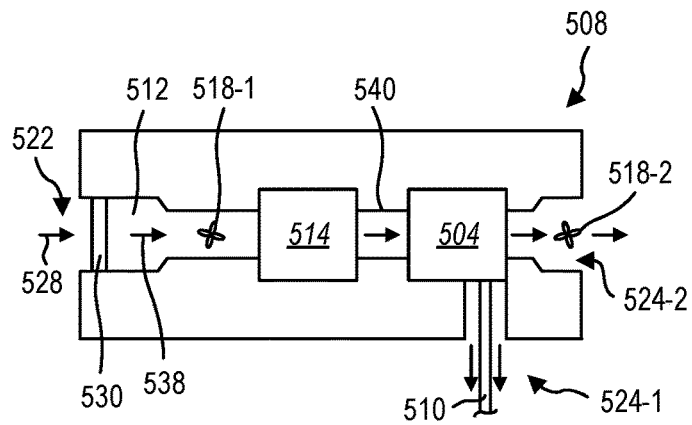
FIG. 5 is a schematic representation of an air flow path through a housing with a plurality of fans, according to at least one embodiment of the present disclosure.

FIG. 5 schematically illustrates yet another housing 508 according to the present disclosure. In some embodiments, an exercise device may have a large control electronics board 514, a large drive motor 504, or a high number of components that cause the flow speed to drop inside the housing 508 or cause turbulent flow of the air over or through the components. In such instances, the exercise device can include a plurality of fans 518-1, 518-2 in the housing 508 to direct and urge air through the interior volume 512.

For example, a first fan 518-1 draws intake air 528 into the intake 522 and through the filter 530. The first fan 518-1 urges filtered air 538 toward the control electronics 514 to cool and clean the control electronics 514. The filtered air 538 continues through the conduit 540 toward the drive motor 504 where a portion of the filtered air 538 proceeds toward the first outlet 524-1 where the driven member 510 is located, and another portion of the filtered air 538 proceeds toward the second outlet 524-2. A second fan 518-2 may be positioned at or near the second outlet 524-2 to draw the filtered air over and/or through the drive motor 504 or other components and exhaust the filtered air through the second outlet 524-2.

Figure 6:
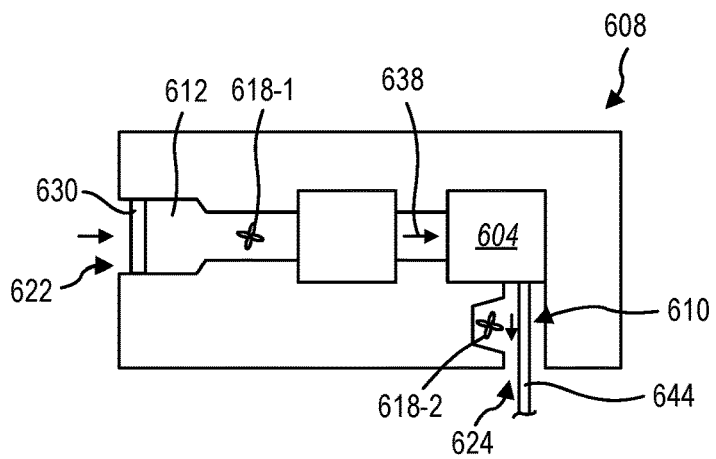
FIG. 6 is a schematic representation of an air flow path through a housing with a fan adjacent an outlet, according to at least one embodiment of the present disclosure.

Referring now to FIG. 6, in yet other embodiments, a housing 608 can include a first fan 618-1 and a second fan 618-2, where the second fan 618-2 is positioned and/or oriented to blow filtered air 638 on the driven member 610. In some examples, the positive pressure generated by a first fan 618-1 positioned near the intake 622 may be insufficient to prevent debris from entering the housing 608. The inbound portion 644 of the driven member 610 may move quickly as the drive motor 604 turns. A second fan 618-2 can be positioned near or adjacent the driven member 610 to blow filtered air on the inbound portion 644 and out the outlet 624. In at least one example, the second fan 618-2 may be the only fan of the housing and exhausting air from the outlet 624 may generate a low-pressure region in the interior volume 612. The low-pressure region can then draw in intake air 628 through the filter 630 without a fan positioned adjacent the intake 622.

Figure 7:
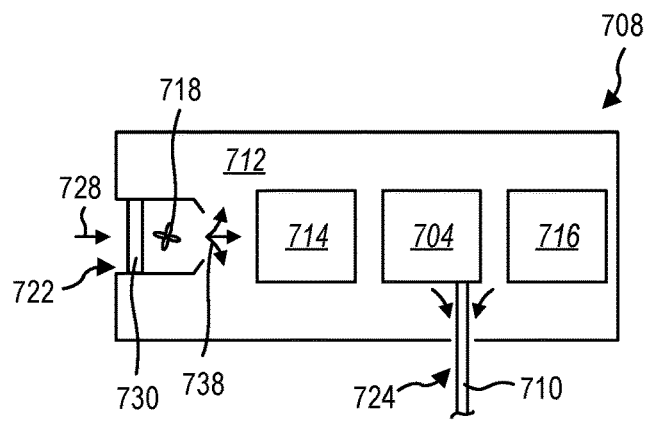
FIG. 7 is a schematic representation of an air flow path through a housing without conduits, according to at least one embodiment of the present disclosure.
Figure 8:
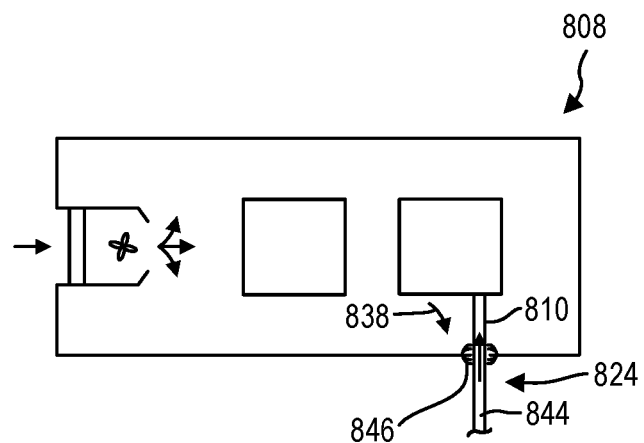
FIG. 8 is a schematic representation of a housing with a sweeping member, according to at least one embodiment of the present disclosure.
Figure 9:
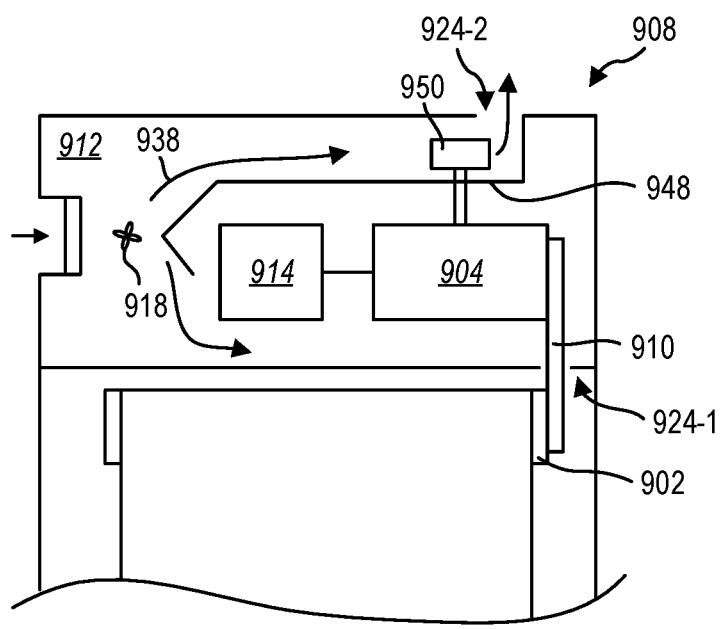
FIG. 9 is a schematic representation of an air flow path through a housing with baffles, according to at least one embodiment of the present disclosure.

In some embodiments, a housing may lack conduits to direct the flow of filtered air within the housing. Rather, the filtered air may flow freely within the interior volume and/or may be directed using baffles located in the interior volume. FIG. 7 through FIG. 9 illustrate examples of filtered air that moves independently of conduits within the interior volume of the housing.

FIG. 7 schematically represents a housing 708 that has a plurality of components positioned in an interior volume 712 of the housing 708 without conduits directing the air flow path. The housing 708 has an intake 722 with a filter 730 positioned therein. A fan 718 is positioned to draw intake air 728 into the intake 722 and through the filter 730. The filtered air 738 is then dispensed into the interior volume 712 to cool and clean electronic components. For example, control electronics 714 can be positioned immediately adjacent the fan 718 such that the fan 718 blows filtered air 738 onto the control electronics 714. The housing 708 further contains electronic components such as the drive motor 704 and a tilt motor 716.

In at least one embodiment, the components are positioned relative to the fan 718 is a descending order of need for cooling and/or cleaning. For example, the transistors, wires, memory modules, wiring junctions, and other circuitry of the control electronics 714 may be the most susceptible to heat damage from debris build-up, and the control electronics 714 can be positioned closest to the fan 718 in the air flow path. The drive motor 704 may have a higher duty cycle than the tilt motor 716, as the drive motor 704 drives the driven member 710 continuously during usage, while the tilt motor 716 is used only periodically to adjust the angle of the exercise device. Because the tilt motor 716 has more time between usages to cool, the drive motor 704 is positioned closer to the fan 718 than the tilt motor 716 in the illustrated example.

The fan 718 draws air through the filter 730 and blows filtered air 738 into the interior volume 712 to maintain a positive pressure at the outlet 724. In some embodiments, the air pressure at the outlet 724 (or plurality of outlets, as described herein) may be at least 1.0 atm, at least 1.05 atm, at least 1.10 atm, or greater.

In some examples, the driven member 710 may have debris affixed thereto that is picked up from a roller or a tread belt. In such cases, the positive pressure alone may be insufficient to dislodge the debris and remove it from the interior volume 712. FIG. 8 illustrates an embodiment of a housing 808 including a sweeping member 846 positioned adjacent to and/or contacting the driven member 810. In some examples, the sweeping member 846 contacts only the inbound portion 844 of the driven member 810. In other examples, the sweeping member 846 sweeps both the inbound portion 844 and the outbound portion.

The sweeping member 846 physically contacts the driven member 810 and the debris thereon, dislodging the debris from the surface of the driven member 810 as the driven member 810 moves past the sweeping member 846. For example, the sweeping member 846 may be brush fibers that contact the surface of the driven member 810. The brush fibers contact and pull the debris from the driven member 810, allowing the positive pressure and air flow of the filtered air 838 to carry the debris out the outlet 824.

FIG. 9 is a schematic representation of a housing 908 including baffles 948 to direct filtered air 938 through the interior volume 912. The baffles 948 direct a portion of the filtered air 938 toward control electronics 914 and a drive motor 904, as described herein. A first outlet 924-1 positioned near the drive motor 904 allows the driven member 910 to move relative to the housing 908.

The baffles 948 direct a second portion of the filtered air 938 in a second air flow path. In some embodiments, the drive motor 904 is in electrical communication with a resistor 950, such as a bleed resistor. In certain conditions, such as when a treadmill is used at an inclined position, the drive motor 904 may function as a brake, limiting the acceleration of the roller 902 and tread belt, and can generate an electrical current. The generated current is dissipated as thermal energy by the resistor 950. In some instances, the resistor 950 can reach temperatures above 300° Fahrenheit.

The resistor 950 may be positioned in a different area of the interior volume 912 that is defined by the baffles 948. The second air flow path directs filtered air 938 over or through the resistor 950 to cool the resistor 950. In some embodiments, the second air flow path may exhaust the filtered air 938 through a second outlet 924-2 after cooling the resistor 950.

In some embodiments, the baffles 948 are fixed in position. In other embodiments, the baffles 948 are movable to direct different proportions of the filtered air 938 to different areas of the interior volume 912. For example, a motor may move at least a portion of the baffles 948 to send a greater or lesser proportion of the filtered air to the resistor 950 based at least partially upon the temperature of the resistor 950. For example, the baffles 948 may direct 40% of the filtered air 938 from the fan 918 toward the resistor 950 when the resistor 950 is less than 150° F. The baffles 948 may direct 50% of the filtered air 938 from the fan 918 toward the resistor 950 when the resistor 950 is greater than 150° F. and less than 200° F. The baffles 948 may direct 60% of the filtered air 938 from the fan 918 toward the resistor 950 when the resistor 950 is greater than 200° F. and less than 250° F. The baffles 948 may direct 70% or more of the filtered air 938 from the fan 918 toward the resistor 950 when the resistor 950 is greater than 250° F.

As described herein, the positive pressure of the interior volume can limit the introduction of debris through the outlet (or plurality of outlets), even when a driven member is moving through the outlet. In some embodiments, a fan may direct air or filtered air toward a tread belt to further limit and/or prevent exposure of the driven member to debris and to flush the debris that is picked up by the tread belt. Cleaning the tread belt with a flow of air may further maintain clean components in the interior volume of the housing.

Figure 10:
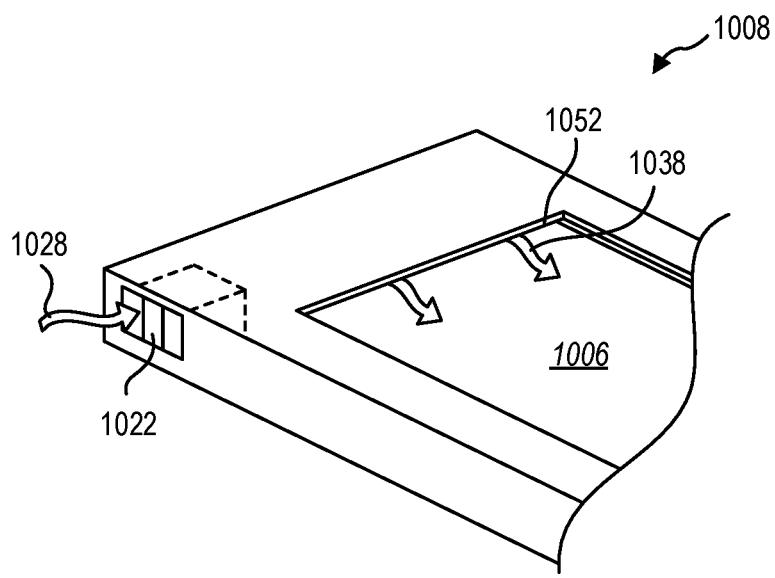
FIG. 10 is a perspective view of a housing with an outlet adjacent a tread belt, according to at least one embodiment of the present disclosure.
Figure 11:
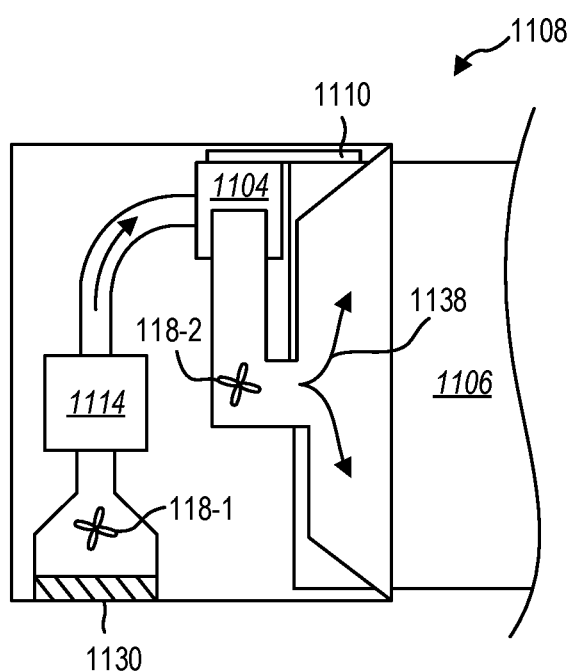
FIG. 11 is a schematic representation of an air flow path through a housing to clean a tread belt, according to at least one embodiment of the present disclosure.
Figure 12:
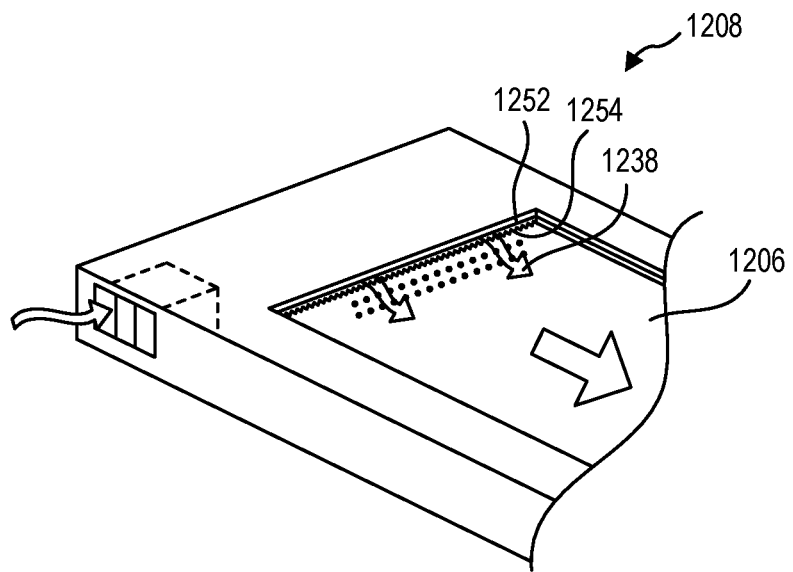
FIG. 12 is a perspective view of a housing with a sweeping member adjacent a tread belt, according to at least one embodiment of the present disclosure.

FIG. 10 through FIG. 12 illustrate an embodiment of an exercise device with a tread belt flushing system to reduce exposure of the driven member and interior volume to environmental debris. FIG. 10 is a perspective view of the housing 1008 and tread belt 1006. The housing 1008 includes an intake 1022 as described herein to receive intake air 1022. The intake air 1028 is filtered and the filtered air 1038 is expelled through a gap 1052 between a portion of the housing 1008 and the tread belt 1006. The expelled filtered air 1038 can assist in evacuating debris from the tread belt 1006 to limit the debris that contacts the drive member.

FIG. 11 is a top schematic view of a housing 1108 that expels filtered air 1138 onto a tread belt 1106. A first fan 1118-1 draws air through the filter 1130 and past control electronics 1114 and a drive motor 1104. An optional second fan 1118-2 blows at least a portion of the filtered air 1138 out of the housing toward the tread belt 1106, blowing debris away from the driven member 1110 connected to the drive motor 1104.

In some embodiments, the air blown on the tread belt 1106 is supplemented by a tread sweeping element that mechanically dislodges debris from the tread belt 1106. FIG. 12 is a perspective view of an embodiment of an exercise device with a tread sweeping element 1254 positioned in the gap 1252 between the housing 1208 and the tread belt 1206. The tread sweeping element 1254 can dislodge debris from the tread belt 1206 and the filtered air 1238 can carry the debris away from the housing 1208.

Figure 13:
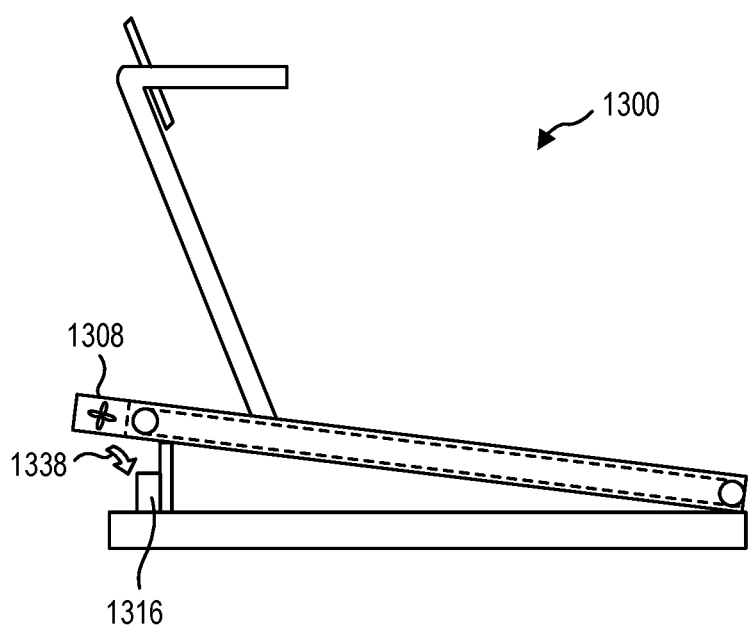
FIG. 13 is a side view of an exercise device with air directed at a tilt motor, according to at least one embodiment of the present disclosure.

FIG. 13 is a side view of an embodiment of an exercise device 1300 that uses the expelled air to cool and/or clean additional components that are positioned outside the housing 1308. For example, the housing 1308 may include an outlet that directs filtered air 1338 at a tilt motor 1316 that is positioned at least partially outside of the housing 1308. While the tilt motor 1316 is not located inside the housing 1308, the air blown through and out of the housing 1308 may still provide additional cooling and cleaning to such components to extend the operational lifetime of the exercise device 1300.

In some embodiments, an exercise device according to the present disclosure may have a fan or fans positioned outside the housing. For example, the housing may be connected to a fan through an external conduit and/or manifold to receive air from the fan. In a gym setting, one or more exercise devices can be cooled and kept clean by a fan and/or cooling device that is located remotely to the exercise devices. A remotely located fan, filter, or cooling device can keep the gym room quieter, cleaner, and cooler. The air may be filtered air that is filtered near the fan upstream from the housing, or the air may be intake air that is filtered by a filter at the housing. In other examples, a cooling device can provide a cooling liquid to the exercise device that is circulated back to the cooling device.

Figure 14:
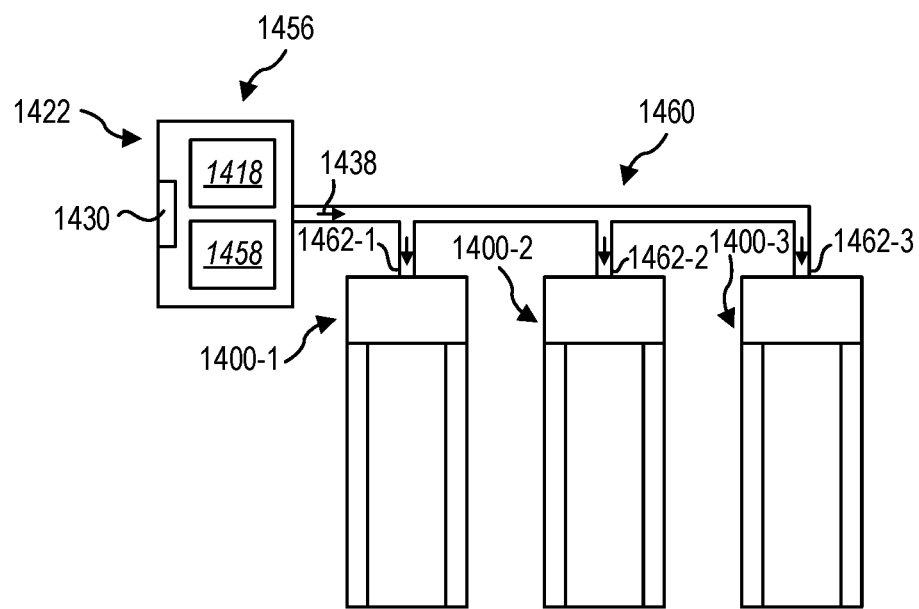
FIG. 14 is a schematic representation of a plurality of exercise devices cooled by an external cooling device, according to at least one embodiment of the present disclosure.

FIG. 14 illustrates an embodiment of a plurality of exercise devices 1400-1, 1400-2, 1400-3 that receive air through an external conduit. In some embodiments, a cooling device 1456 has an intake 1422 to receive air through a filter 1430. The cooling device 1456 includes a fan 1418 that draws the air through the filter 1430 and blows filtered air 1438 into an external conduit 1460 toward one or more exercise devices 1400-1, 1400-2, 1400-3. While the embodiment illustrated in FIG. 14 shows the filter 1430 positioned at the intake 1422 of the cooling device 1456, in other embodiments, the filter 1430 may be a plurality of filters with each filter positioned at an exercise device, respectively.

The cooling device 1456 may provide filtered air 1438 (or unfiltered air which is filtered at the exercise device) to one or more exercise devices 1400-1, 1400-2, 1400-3. In some embodiments, the air provided by the cooling device 1456 is further cooled before being sent through the external conduit 1460 to the exercise devices 1400-1, 1400-2, 1400-3. For example, the cooling device 1456 may include a compressor 1458, solid-state cooling device (e.g., Peltier cooler) or other refrigeration component that reduces the temperature of the filtered air 1438 blown by the fan 1418. In other examples, a compressor 1458 or other refrigeration component may cool the air before filtration.

In some embodiments, the external conduit 1460 is a flexible hose that is connected to one or more exercise devices 1400-1, 1400-2, 1400-3. For example, a single exercise device 1400-1 can be connected to an external cooling device 1456 such that the compressor 1458 of the cooling device 1456 dumps heat in another area of the room or outside of the room containing the exercise device 1440-1. In other examples, a plurality of exercise devices 1400-1, 1400-2, 1400-3 can be connected in series by a plurality of flexible hoses linking each of the exercise devices 1400-1, 1400-2, 1400-3 to the next. In other embodiments, the external conduit 1460 includes a manifold, as shown in FIG. 14, that allows a plurality of exercise devices 1400-1, 1400-2, 1400-3 to be connected to the filtered air in parallel to one another.

A manifold such as the external conduit 1460 of FIG. 14 can allow a delivery of equally clean and cool air to each of the connected exercise devices 1400-1, 1400-2, 1400-3. The manifold can also remain connected to the cooling device 1456 while one or more of the exercise devices 1400-1, 1400-2, 1400-3 is disconnected, connected, or moved relative to other exercise devices 1400-1, 1400-2, 1400-3, without disrupting the airflow to the other exercise devices 1400-1, 1400-2, 1400-3. For example, a first exercise device 1400-1 can be disconnected from the external conduit 1460 and the filtered air 1438 can continue to be delivered to the second and third exercise devices 1400-2, 1400-3.

In some embodiments, the external conduit 1460 delivers air only to connected exercise devices 1400-1, 1400-2, 1400-3. For example, the external conduit 1460 of FIG. 14 may deliver filtered air 1438 to the connected first exercise device 1400-1, second exercise device 1400-2, and third exercise device 1400-3. If the first exercise device 1400-1 is disconnected at a first connector 1462-1, the external conduit 1460 will deliver air through the second connector 1462-2 to the second exercise device 1400-2 and through the third connector 1462-3 to the third exercise device 1400-3 only.

Figure 15:
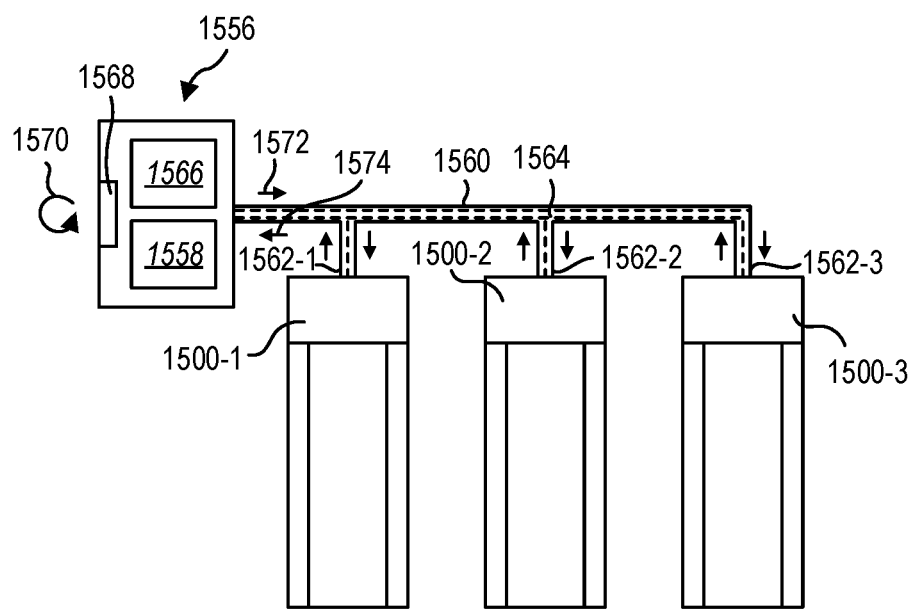
FIG. 15 is a schematic representation of a plurality of exercise devices cooled by a recirculating cooling fluid, according to at least one embodiment of the present disclosure.

Referring now to FIG. 15, in some embodiments, a cooling device 1556 and external conduit 1560 can circulate a cooling fluid 1564 away from the cooling device 1556 and back to the cooling device 1556 to create a closed cooling system. For example, a closed cooling system can allow a plurality of exercise devices 1500-1, 1500-2, 1500-3 to remain sealed, limiting the introduction of environmental debris to a housing of the exercise devices 1500-1, 1500-2, 1500-3. The cooling device 1556 includes a pump 1566 to circulate a cooling fluid 1564 to the plurality of exercise devices 1500-1, 1500-2, 1500-3 to cool the exercise devices 1500-1, 1500-2, 1500-3. The cooling fluid 1564 then circulates back to the cooling device 1556 to a compressor 1558 or other refrigeration device to cool the warmed cooling fluid 1564.

The cooling device 1556 can further include a heat sink 1568 or other mechanism for dissipating the heat from the warm cooling fluid 1564. Recirculating air 1570 can cool the heat sink 1568, carrying the heat away from the cooling device 1556. As described herein, the cooling device 1556 can be located away from the plurality of exercise devices 1500-1, 1500-2, 1500-3 and dump the heat from the exercise devices 1500-1, 1500-2, 1500-3 away from users. In some embodiments, a plurality of liquid-cooled exercise devices 1500-1, 1500-2, 1500-3 may be quieter and/or more efficient than a plurality of air-cooled exercise devices 1500-1, 1500-2, 1500-3.

In recirculating embodiments, such as that described in relation to FIG. 15, the external conduit 1560 has at least two channels: an outbound channel 1574 and an inbound channel 1572. Similarly, the connections 1562-2, 1562-2, 1562-3 between the external conduit 1560 and the exercise devices 1500-1, 1500-2, 1500-3 have inbound and outbound connections.

Figure 16:
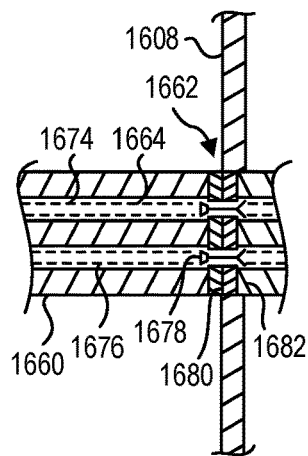
FIG. 16 is a cross-sectional view of an external conduit with a valve, according to at least one embodiment of the present disclosure.

FIG. 16 is a detail view of an embodiment of a connection 1662 between an external conduit 1660 and a housing 1608 of an exercise device. The external conduit 1660 has an outbound channel 1674 and an inbound channel 1676 that carry cooling fluid 1664 to the housing 1608. The external conduit 1660 has a terminal end that includes a valve 1678 and a seat 1680. The valve 1678 may be held against the seat 1680 by a spring, a bushing, a fluid pressure of the cooling fluid 1664, or other force that urges the valve 1678 toward the terminal end.

When seated against the seat 1680, the valve 1678 is closed and prevents the flow of cooling fluid 1664 through the external conduit 1660. When the external conduit 1660 is coupled to the housing 1608 at the connection 1662, a pin 1682 in the housing side of the connection 1662 can apply a force to the valve 1678 to unseat the valve 1678 and allow the cooling fluid 1664 to flow in and out of the housing 1608. The external conduit 1660 and the housing 1608 can be held together at the connection 1662 by a magnetic force; an actuated retention mechanism; a mechanical interlock, such as a snap fit, a friction fit, a threaded connection, a twist lock, or a quick-connect push-to-connect fitting; or other retention mechanism that allows the connection 1662 to be broken and remade selectively.

In at least one example, a commercial gym may have a plurality of exercise devices in a gym room and a cooling device located in another room. The external conduit 1660 may extend from the cooling device to into the gym room, for example, through a wall. The noise and heat produced by the cooling device can then by separated from the users. A quick connect fitting can allow exercise devices to be disconnected from a source of cooling/cleaning and moved in, out, or within the gym room easily. The exercise devices can then be removed, relocated, or replaced without the added weight or increased dimensions of onboard cooling.

The valve 1678 of the external conduit 1660 can seal the external conduit 1660 so that other exercise devices can be used while one or more of the other exercise devices are being moved. Once the exercise device is moved to a desired new location, the connection 1662 can be recoupled between the housing 1608 and the external conduit 1660. The cooling fluid 1664 can then commence flowing through the housing 1608 of the exercise device and cool the exercise device during usage. A second exercise device can then be disconnected from another connection of the external conduit 1660 and moved or serviced while the first exercise device is used.

Figures 1, 17:
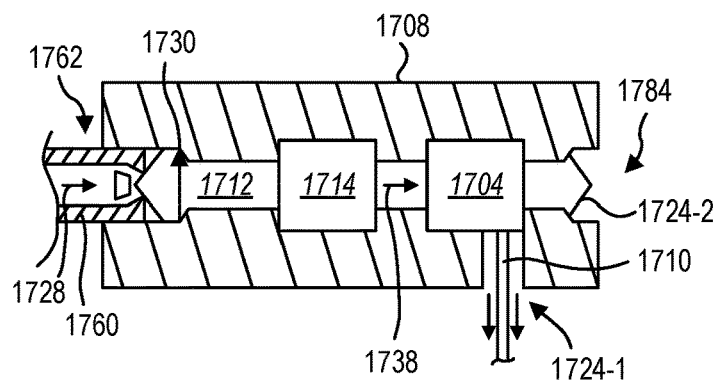
Figures 2, 17:
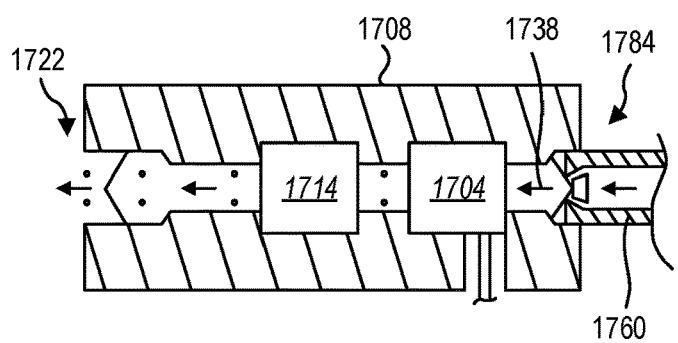

FIGS. 17-1 and 17-2 schematically illustrate an example of a housing 1708 with an external source of non-circulating air. Similar to the embodiments described in relation to FIG. 1 though FIG. 13, at least a portion of the air is expelled through an outlet in the housing. The housing 1708 contains an interior volume 1712 in communication with control electronics 1714 and a drive motor 1704.

A connection 1762 between the housing 1708 and an external conduit 1760 delivers an intake air 1728 to the housing 1708. In some embodiments, the intake air 1728 is filtered between reaching the housing 1708. In other embodiments, the intake air 1728 is unfiltered. For unfiltered intake air 1728, the housing 1708 can contain a filter 1730 to clean the intake air 1728. In some examples, a filter 1730 may be present even when the intake air 1728 is filtered at the external cooling device or external fan.

Filtered air 1738 then passes through the interior volume 1712 of the housing 1708 and cools and/or cleans the control electronics 1714 and the drive motor 1704 before being expelled through a first opening 1724-1 adjacent the driven member 1710. In some examples, a second outlet 1724-2 is present on the housing 1708 and filtered air 1738 may exhaust through the second outlet 1724-2, as well.

In some embodiments, a second outlet 1724-2 includes a cleaning port 1784 to which the external conduit or other source of pressurized air or gas can be connected. The cleaning port 1784 may allow a clean or filtered air to be introduced to the housing to blow any accumulated debris from the components and/or housing 1708. In FIG. 17-2, the external conduit 1760 is shown connected to the cleaning port 1784 to deliver filtered air 1738 into the housing 1708 in a substantially opposite direction from the intake 1722.

By delivering clean or filtered air 1738 into the housing 1708 in an opposite direction of the intake 1722, the filtered air 1738 can dislodge any debris that is located in the lee of a component. For example, the filtered air 1738 can blow on the drive motor 1704 and/or control electronics from the opposite direction as the filtered air shown in FIG. 17-1, dislodging debris and clearing accumulated debris from the housing 1708. To further facilitate the clearing of debris, the filter is removed from the housing 1708 so that the intake 1722 is not obstructed.

INDUSTRIAL APPLICABILITY

In general, the present invention relates to an exercise device including a cooling system that provides clean, cool air to a housing of the exercise device that contains electronic components. The flow of air prevents dirt and debris from entering the housing. Electronic components generate heat during use. For example, a drive motor, a tilt motor, control electronics, a bleed resistor, and other components such as shock absorbers or brakes all generate heat during use that can adversely affect the performance and/or reliability of the exercise device during use or over long-term usage. In some examples, heat can damage solder or other electrical connections and cause one or more parts of the exercise device to fail.

Even with airflow through the housing containing the heat generating components, extracting the heat and keeping the components cool can be challenging. Environmental dirt and debris can exacerbate the problems with the heat generation by accumulating in or on the components of the exercise device. Fluid droplet and particulates, such as dust and dirt, can stick to heat generating components and create and insulating layer on the components. The insulating layer of debris can limit the dissipation of heat and prevent cool air from extracting and carrying away heat from the components.

In some embodiments of the present disclosure, an exercise system includes a sealed housing with a filtered intake to prevent the introduction of dust and debris from the system through the intake. In at least one embodiment, a fan draws air in through the intake into an interior volume of the housing to create a positive pressure in the interior volume and at an outlet of the housing. The positive pressure can limit and/or prevent the entrance of debris through the outlet.

In some embodiments, an exercise device includes a roller that is driven by a drive motor. The roller, in turn, supports and drives a tread belt. While embodiments of the present disclosure are described in relation to a treadmill, it should be understood that the sealed housing, filtered intake, positive pressure outlet, and other features described herein may be applicable to other types of exercise devices, such as elliptical machines, stationary bicycles, handcycles, step machines, rowing machines, etc.

The drive motor and other components are contained within a housing. The drive motor can generate heat that becomes trapped in the housing. The temperature inside the housing can increase and potentially damage components in the housing during use. For example, in a commercial gym setting, a treadmill drive motor may be in operation for many hours per day. In some commercial gyms open 24 hours each day, a drive motor could potentially be in operation nearly continuously. Thermal management can increase the operational lifetime and reliability of such exercise devices.

The tread belt is driven by the drive motor through a driven member connecting the drive motor to the roller. In some embodiments, the driven member is a drive belt. In other embodiments, the driven member is another rotational element, such as a drive chain. In yet other embodiments, the driven member is a reciprocal or oscillating element, such as a piston or piston rod. In further embodiments, the driven member is a rotating rod or similar element to deliver torque from the drive motor to the roller.

The housing defines an interior volume in which the drive motor and other heat generating components are positioned. For example, the housing may contain control electronics, a tilt motor, a fan, or other components. In some embodiments, the housing is sealed to limit the movement of debris into the interior volume. For example, the housing can be sealed such that the only openings in the housing to the interior volume are a filtered intake and an outlet through which the driven member is positioned.

The tread belt moves with a rotational direction to provide the moving surface on which a user walks or runs. In order to provide that movement, the driven member moves relative to the housing. For example, a drive belt rotates as the drive motor rotor rotates, and the drive belt transmits the rotation to the roller to move the tread belt. As the drive belt (or other driven member) moves relative to the housing, the drive belt can potentially draw debris into the interior volume of the housing. For example, debris may be affixed to the drive belt and carried into the interior volume through the outlet. In other examples, drag on the air surrounding the drive belt may cause air to flow into the outlet and draw debris into the interior volume.

In some embodiments, the fan draws air in through the filtered intake and creates a positive pressure in the interior volume to overcome the drag created by the movement of the driven member. The positive pressure may, therefore, limit and/or prevent the introduction of debris into the interior volume through the outlet.

A housing can include a fan that draws in intake air through an intake. The intake allows the intake air to enter a filter positioned in the air flow path of the intake and the fan. The order and/or relative positioning of the filter and the fan in the air flow path may vary. The filter is positioned in the air flow path to filter the intake air before exposure to any of the components housed in the housing, thereby ensuring only filtered air comes in contact with the electronic components.

To further limit and/or prevent the exposure of electronic components to unfiltered air, the housing may be sealed along any joints, with the exception of the intake and any outlets. For example, a housing may be formed through a clamshell configuration or other mating of a first portion and a second portion. The first portion and second portion may have a joint therebetween. The housing can include a sealing member, such as a gasket, a cover, an adhesive, a tape, or other material or structure that is applied to and/or positioned in the joint to limit and/or prevent air flow through the joint between the first portion and second portion. With air flow only available through the intake, the air in the housing can be limited to only the intake air that passed through the filter.

In some embodiments, the filter is a particulate filter. For example, the filter may have a particle rating (e.g., the larger particle that can pass through the filter) of less than 1 µm. In other examples, the filter can have a particle rating of less than 0.5 µm. In yet other examples, the filter can have a particle rating of less than 0.3 µm. In at least one example, the filter has a particle rating of less than 0.25 µm. In other embodiments, the filter is a reactive filter, such as an activate carbon filter. In yet other embodiments, the filter is a HEPA filter. In further embodiments, the filter includes an electrostatic filter to remove charged or ionized particles. In yet further embodiments, the filter includes an ultraviolet light to irradiate the intake air and/or filtered air after intake air passes through a portion of the filter.

In some embodiments, a housing contains a fan, a filter, control electronics, and a drive motor. The intake air is drawn into an interior volume of the housing defined by a series of boxes or covers around the components with conduits therebetween. The filter is positioned in the path of the air flow before the fan to filter intake air before the filtered air contacts the fan. The fan can then direct the filtered air at the control electronics. The control electronics are positioned directly adjacent the fan in the air flow path of the filtered air such that the control electronics receive the filtered air at the lowest temperature in the housing for the efficient cooling of the control electronics.

The filtered air can pass from the control electronics through a conduit to the drive motor to cool the drive motor. The warm filtered air can subsequently pass from in and/or around the drive motor through the outlet and out of the housing. The outlet may be shared with the driven member. In some embodiments, the driven member may have an inbound portion that moves into the housing toward the drive motor from outside the housing. The inbound portion of the driven member can carry or drag debris into the housing through the outlet. The flow of intake air into and the filtered air through the housing creates a positive pressure in the housing that blows the warm filtered air out the outlet. The exhaust of the warm filtered air limits and/or prevents the introduction of debris through the outlet even when the inbound portion of the driven member is moving into the housing.

In some embodiments, a fan can be positioned in the intake to draw intake air in and toward the filter. In some instances, the fan may include an oil or other lubricant on an axle of the fan. Positioning a filter after the fan in the air flow path can filter any lubricant particles from the intake air.

The position of components in the air flow path can change to accommodate different cooling and thermal management needs depending on the components and the relative heat generation of the components. For example, the control electronics may be more sensitive to damage from heat than the drive motor.

In some embodiments, the drive motor is placed closer to the fan than the control electronics. For example, the drive motor may be more susceptible to heat damage than the control electronics. In other examples, the drive motor may operate at a lower temperature than the control electronics. In such examples, the air may be too warm after passing the control electronics to sufficiently cool the drive motor. Positioning the drive motor before the control electronics allows the drive motor to be cooled before the air continues through the conduit to the control electronics, which heat the air more.

Some embodiments of housings may have a plurality of outlets. For example, the first outlet may be shared with the driven member. When the drive motor is positioned in the air flow path before the control electronics or other components to be cooled, the first outlet exhausts filtered air before all components are cooled by the air. A second outlet can exhaust filtered air that has passed around or through the control electronics or other components. The fan can maintain a positive pressure at both the first outlet and the second outlet.

In some embodiments, the housing can have a plurality of intakes to allow sufficient volume of cool air to be introduced to the housing for cooling. In some examples, the intake (or plurality of intakes) can have a total intake area that is equal to or greater than a total outlet area of the outlet or plurality of outlets. A larger intake area than outlet area causes the air drawn in by the fan to accelerate through the interior volume and/or conduits of the housing. The increased speed at the outlets may aid in limiting and/or preventing debris from flowing back in through the outlets. In some embodiments, an I/O ratio (intake area to outlet area) may be in a range having an upper value, a lower value, or upper and lower values including any of 1:1, 3:2, 2:1, 3:1, 4:1, 5:1, 7:1, 10:1, or any values therebetween. For example, the I/O ratio of the housing may be greater than 1:1. In other examples, the I/O ratio of the housing may be less than 10:1. In yet other examples, the I/O ratio may be between 1:1 and 10:1. In yet other examples, the I/O ratio may be between 3:2 and 4:1. In at least one example, the I/O ratio is about 2:1.

In some embodiments, an exercise device may have a large control electronics board, a large drive motor, or a high number of components that cause the flow speed to drop inside the housing or cause turbulent flow of the air over or through the components. In such instances, the exercise device can include a plurality of fans in the housing to direct and urge air through the interior volume.

For example, a first fan can draw intake air into the intake and through the filter. The first fan urges filtered air toward the control electronics to cool and clean the control electronics. The filtered air continues through the conduit toward the drive motor where a portion of the filtered air proceeds toward the first outlet where the driven member is located, and another portion of the filtered air proceeds toward the second outlet. A second fan may be positioned at or near the second outlet to draw the filtered air over and/or through the drive motor or other components and exhaust the filtered air through the second outlet.

In yet other embodiments, a housing can include a first fan and a second fan, where the second fan is positioned and/or oriented to blow filtered air on the driven member. In some examples, the positive pressure generated by a first fan positioned near the intake may be insufficient to prevent debris from entering the housing. The inbound portion of the driven member may move quickly as the drive motor turns. A second fan can be positioned near or adjacent the driven member to blow filtered air on the inbound portion and out the outlet. In at least one example, the second fan may be the only fan of the housing and exhausting air from the outlet may generate a low-pressure region in the interior volume. The low-pressure region can then draw in intake air through the filter without a fan positioned adjacent the intake.

In some embodiments, a housing may lack conduits to direct the flow of filtered air within the housing. Rather, the filtered air may flow freely within the interior volume and/or may be directed using baffles located in the interior volume.

A housing can have a plurality of components positioned in an interior volume of the housing without conduits or baffling directing the air flow path. The housing has an intake with a filter positioned therein. A fan is positioned to draw intake air into the intake and through the filter. The filtered air is then dispensed into the interior volume to cool and clean electronic components. For example, control electronics can be positioned immediately adjacent the fan such that the fan blows filtered air onto the control electronics. The housing can then also contain other electronic components such as the drive motor and a tilt motor.

In at least one embodiment, the components are positioned relative to the fan is a descending order of need for cooling and/or cleaning. For example, the transistors, wires, memory modules, wiring junctions, and other circuitry of the control electronics may be the most susceptible to heat damage from debris build-up, and the control electronics can be positioned closest to the fan in the air flow path. The drive motor may have a higher duty cycle than the tilt motor, as the drive motor drives the driven member continuously during usage, while the tilt motor is used only periodically to adjust the angle of the exercise device. Because the tilt motor has more time between usages to cool, the drive motor is positioned closer to the fan than the tilt motor.

The fan draws air through the filter and blows filtered air into the interior space to maintain a positive pressure at the outlet. In some embodiments, the air pressure at the outlet (or plurality of outlets, as described herein) may be at least 1.0 atm, at least 1.05 atm, at least 1.1 atm, or greater.

In some examples, the driven member may have debris affixed thereto that is picked up from a roller or a tread belt. In such cases, the positive pressure alone may be insufficient to dislodge the debris and remove it from the interior volume. In some examples, a sweeping member is positioned in contact with the driven member. The driven members may contact only the inbound portion of the driven member. In other examples, the sweeping member sweeps both the inbound portion and the outbound portion.

The sweeping member physically contacts the driven member and the debris thereon, dislodging the debris from the surface of the driven member as the driven member moves past the sweeping member. For example, the sweeping member may be brush fibers that contact the surface of the driven member. The brush fibers contact and pull the debris from the driven member, allowing the positive pressure and air flow of the filtered air to carry the debris out the outlet.

In other embodiments, a housing includes baffles to direct filtered air through the interior volume. The baffles can direct a first portion of the filtered air toward control electronics and a drive motor, as described herein. A first outlet positioned near the drive motor allows the driven member to move relative to the housing while the portion of the filtered air flows out past the driven member.

The baffles direct a second portion of the filtered air in a second air flow path. In some embodiments, the drive motor is in electrical communication with a resistor, such as a bleed resistor or dump resistor. In certain conditions, such as when a treadmill is used at an inclined position, the drive motor may function as a brake, limiting the acceleration of the roller and tread belt and can generate an electrical current. The generated current is dissipated as thermal energy by the resistor. In some instances, the resistor can reach temperatures above 300° Fahrenheit.

The resistor may be positioned in a different area of the interior volume that is defined by the baffles. The second air flow path directs filtered air over other through the resistor to cool the resistor. In some embodiments, the second air flow path may exhaust the filtered air through a second outlet after cooling the resistor.

In some embodiments, the baffles are fixed in position. In other embodiments, the baffles are movable to direct different proportions of the filtered air to different areas of the interior volume. For example, a motor may move at least a portion of the baffles to send a greater or lesser proportion of the filtered air to the resistor based at least partially upon the temperature of the resistor or temperature of air in the interior volume. For example, the baffles may direct 40% of the filtered air from the fan toward the resistor when the resistor is less than 150° F. The baffles may direct 50% of the filtered air from the fan toward the resistor when the resistor is greater than 150° F. and less than 200° F. The baffles may direct 60% of the filtered air from the fan toward the resistor when the resistor is greater than 200° F. and less than 250° F. The baffles may direct 70% or more of the filtered air from the fan toward the resistor when the resistor is greater than 250° F.

As described herein, the positive pressure of the interior volume can limit the introduction of debris through the outlet (or plurality of outlets), even when a driven member is moving through the outlet. In some embodiments, a fan may direct air or filtered air toward a tread belt to further limit and/or prevent exposure of the driven member to debris and to flush the debris that is picked up by the tread belt. Cleaning the tread belt with a flow of air may further maintain clean components in the interior volume of the housing.

In some embodiments, an exercise device can have a tread belt flushing system to reduce exposure of the driven member and interior volume to environmental debris. The housing can include an intake as described herein to receive intake air. The intake air is filtered and the filtered air is expelled through a gap between a portion of the housing and the tread belt. The expelled filtered air can assist in evacuating debris from the tread belt to limit the debris that contacts the drive member.

A first fan draws air through the filter and past control electronics and a drive motor. An optional second fan can blow at least a portion of the filtered air out of the housing toward the tread belt, blowing debris away from the driven member connected to the drive motor.

In some embodiments, the air blown on the tread belt is supplemented by a tread sweeping element that mechanically dislodges debris from the tread belt. The tread sweeping element can be positioned in the gap between the housing and the tread belt. The tread sweeping element can dislodge debris from the tread belt and the filtered air can carry the debris away from the housing.

In other embodiments, an embodiment of an exercise device can use the expelled air to cool and/or clean additional components that are positioned outside the housing. For example, the housing may include an outlet that directs filtered air at a tilt motor that is positioned at least partially outside of the housing. While the tilt motor is not located inside the housing, the air blown through and out of the housing may still provide additional cooling and cleaning to such components to extend the operational lifetime of the exercise device.

In some embodiments, an exercise device according to the present disclosure may have a fan or fans positioned outside the housing. For example, the housing may be connected to a fan through an external conduit and/or manifold to receive air from the fan. In a gym setting, one or more exercise devices can be cooled and kept clean by a fan and/or cooling device that is located remotely to the exercise devices. A remotely located fan, filter, or cooling device can keep the gym room quieter, cleaner, and cooler. The air may be filtered air that is filtered near the fan upstream from the housing, or the air may be intake air that is filtered by a filter at the housing. In other examples, a cooling device can provide a cooling liquid to the exercise device that is circulated back to the cooling device.

Some embodiments of an exercise system include a plurality of exercise devices that receive air from an external cooling device through an external conduit. In some embodiments, a cooling device has an intake to receive air through a filter. The cooling device includes a fan that draws the air through the filter and blows filtered air into an external conduit toward one or more exercise devices. While some embodiments have the filter positioned at the intake of the cooling device, in other embodiments, the filter may be a plurality of filters with each filter positioned at an exercise device at terminal ends of the external conduit(s), respectively.

The cooling device may provide filtered air (or unfiltered air which is filtered at the exercise device) to one or more exercise devices. In some embodiments, the air provided by the cooling device is cooled before being sent through the external conduit to the exercise devices. For example, the cooling device may include a compressor or other refrigeration component that reduces the temperature of the filtered air blown by the fan. In other examples, a compressor or other refrigeration component may cool the air before filtration.

In some embodiments, the external conduit is a flexible hose that is connected to one or more exercise devices. For example, a single exercise device can be connected to an external cooling device such that the compressor of the cooling device dumps heat in another area of the room or outside of the room containing the exercise device. In other examples, a plurality of exercise devices can be connected in series by a plurality of flexible hoses linking each of the exercise devices to the next. In yet other embodiments, the external conduit includes a manifold that allows a plurality of exercise devices to be connected to the filtered air in parallel to one another.

A manifold can allow a delivery of equally clean and cool air to each of the connected exercise devices. The manifold can also remain connected to the cooling device while one or more of the exercise devices is disconnected, connected, or moved relative to other exercise devices, without disrupting the airflow to the other exercise devices. For example, a first exercise device can be disconnected from the external conduit and the filtered air can continue to be delivered to the second and third exercise devices.

In some embodiments, the external conduit delivers air only to connected exercise devices. For example, the external conduit may deliver filtered air to the connected first exercise device, second exercise device, and third exercise device. If the first exercise device is disconnected at a first connector, the external conduit will deliver air through the second connector to the second exercise device and through the third connector to the third exercise device only.

In some embodiments, a cooling device and external conduit can circulate a cooling fluid away from the cooling device and back to the cooling device to create a closed cooling system. For example, a closed cooling system can allow a plurality of exercise devices to remain sealed, limiting the introduction of environmental debris to a housing of the exercise devices. The cooling device includes a pump to circulate a cooling liquid or other fluid to the plurality of exercise devices to cool the exercise devices. The cooling fluid then circulates back to the cooling device to a compressor or other refrigeration device to cool the warmed cooling fluid.

The cooling device can further include a heat sink or other mechanism for dissipating the heat from the warm cooling fluid. Recirculating air can cool the heat sink, carrying the heat away from the cooling device. As described herein, the cooling device can be located away from the plurality of exercise devices and dump the heat from the exercise devices away from users. In some embodiments, a plurality of liquid-cooled exercise devices may be quieter and/or more efficient than a plurality of air-cooled exercise devices.

In recirculating embodiments, the external conduit has at least two channels: an outbound channel and an inbound channel. Similarly, the connections between the external conduit and the exercise devices have inbound and outbound connections.

An external conduit can be connected or disconnected to an exercise device without terminating a flow from the cooling device. In some embodiments, the external conduit has a terminal end that can include a valve and a seat. The valve may be held against the seat by a spring, a bushing, a fluid pressure of the cooling fluid, or other force that urges the valve toward the terminal end.

When seated against the seat, the valve is closed and prevents the flow of cooling fluid through the external conduit. When the external conduit is coupled to the housing at the connection, a pin in the housing side of the connection can apply a force to the valve to unseat the valve and allow the cooling fluid to flow in and out of the housing. The external conduit and the housing can be held together at the connection by a magnetic force; an actuated retention mechanism; a mechanical interlock, such as a snap fit, a friction fit, a threaded connection, a twist lock (e.g., a BNC connector), or a quick-connect push-to-connect fitting; or other retention mechanism that allows the connection to be broken and remade selectively.

In at least one example, a commercial gym may have a plurality of exercise devices in a gym room and a cooling device located in another room. The external conduit may extend from the cooling device to into the gym room, for example, through a wall. The noise and heat produced by the cooling device can then by separated from the users. A quick connect fitting can allow exercise devices to be disconnected from a source of cooling/cleaning and moved in, out, or within the gym room easily. The exercise devices can then be removed, relocated, or replaced without the added weight or increased dimensions of onboard cooling.

The valve of the external conduit can seal the external conduit so that other exercise devices can be used while one or more of the other exercise devices are being moved. Once the exercise device is moved to a desired new location, the connection can be recoupled between the housing and the external conduit. The cooling fluid can then commence flowing through the housing of the exercise device and cool the exercise device during usage. A second exercise device can then be disconnected from another connection of the external conduit and moved or serviced while the first exercise device is used.

In other embodiments, a housing can be connected to an external source of non-circulating air. For example, an external cooling device can provide air to the housing, and at least a portion of the air is expelled through an outlet in the housing. The housing contains an interior volume in communication with control electronics and a drive motor.

A connection between the housing and an external conduit delivers an intake air to the housing. In some embodiments, the intake air is filtered before reaching the housing. In other embodiments, the intake air is unfiltered. For unfiltered intake air, the housing can contain a filter to clean the intake air. In some examples, a filter may be present even when the intake air is filtered at the external cooling device or external fan.

Filtered air then passes through the interior volume of the housing and cools and/or cleans the control electronics and the drive motor before being expelled through a first opening adjacent the driven member. In some examples, a second outlet is present on the housing and filtered air may exhaust through the second outlet, as well.

In some embodiments, a second outlet includes a cleaning port to which the external conduit or other source of pressurized air or gas can be connected. The cleaning port may allow a clean or filtered air to be introduced to the housing to blow any accumulated debris from the components and/or housing. In some examples, the external conduit is connected to the cleaning port to deliver filtered air into the housing in a substantially opposite direction from the intake.

By delivering clean or filtered air into the housing in an opposite direction of the intake, the filtered air can dislodge any debris that is located in the lee of a component. For example, the filtered air can blow on the drive motor and/or control electronics from the opposite direction as the filtered air delivered through the intake, dislodging debris and clearing accumulated debris from the housing. To further facilitate the clearing of debris, the filter can be removed from the housing so that the intake is not obstructed.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An exercise system comprising:
    a housing defining an interior volume, the housing having an intake and an outlet and an air flow path between the intake and the outlet;
    a drive motor positioned inside the housing in the interior volume on the air flow path;
    a drive member connected to the drive motor, at least part of the drive member positioned inside the housing in the interior volume on the air flow path and part of the drive member outside the housing, the drive member positioned through the outlet in the housing;
    a filter in fluid communication with the intake on the air flow path; and
    a fan in fluid communication with the intake and the filter on the air flow path, the fan providing an airflow on the air flow path between the fan and the outlet.

2. The exercise system of claim 1, the drive member being a drive belt.

3. The exercise system of claim 1, the housing having only one intake.

4. The exercise system of claim 1, the housing having only one outlet.

5. The exercise system of claim 1, the intake having an intake area larger than an outlet area.

6. The exercise system of claim 1, the filter positioned between the intake and the fan.

7. The exercise system of claim 1, the drive motor positioned in the air flow path.

8. The exercise system of claim 7, the drive motor positioned directly adjacent the fan.

9. The exercise system of claim 1 further comprising control electronics positioned within the housing.

10. The exercise system of claim 9, the control electronics positioned directly adjacent the fan in the air flow path.

11. The exercise system of claim 1 further comprising a tilt motor positioned to move the housing relative to a base.

12. The exercise system of claim 11, the tilt motor positioned in the air flow path.

13. The exercise system of claim 1, the fan positioned outside the housing.

14. The exercise system of claim 1, the drive motor and the drive member being located along the air flow path between the fan and the outlet.

15. An exercise system comprising:
    a base;
    a housing supported by the base, the housing defining an interior volume and having an intake and an outlet, the housing defining an air flow path between the intake and the outlet, the interior volume being located in the air flow path between the intake and the outlet;
    a drive motor positioned inside the housing in the interior volume;
    a drive belt connected to the drive motor and supported by the base, at least part of the drive belt movable from outside the housing to the interior volume inside the housing through the outlet in the housing;
    a roller connected to the drive belt and driven by the drive belt;
    a filter in fluid communication with the intake; and
    a fan in fluid communication with the intake and the filter, the fan providing ventilation on the air flow path in the interior volume of the housing to the outlet, the ventilation overcoming air flow into the outlet caused by drag from the drive belt.

16. The exercise system of claim 15, a first portion of the outlet being proximate an inbound portion of the drive belt and a second portion of the outlet being proximate an outbound portion of the drive belt, where a sealing member is positioned in the first portion to obstruct airflow through the first portion of the outlet.

17. The exercise system of claim 16, the sealing member being in contact with the drive belt to remove debris from the inbound portion of the drive belt.

18. The exercise system of claim 15, the fan being an intake fan, and the exercise system the further comprising an outlet fan.

19. The exercise system of claim 17, the outlet fan being positioned and oriented to direct air flow at an inbound portion of the drive belt.

20. An exercise system comprising:
a base;
a housing supported by the base, the housing defining an air flow path between an intake and an outlet, the air flow path including an interior volume of the housing;
a drive motor positioned in the interior volume;
a belt connected to the drive motor and supported by the base, at least part of the belt movable from outside the housing to inside the housing through the outlet in the housing;
a filter in fluid communication with the intake; and
a fan in fluid communication with the intake and the filter on the air flow path, the drive motor being located between the fan and the outlet on the air flow path.

* * * * *